US010983953B2

(12) United States Patent
Rajawat et al.

(10) Patent No.: US 10,983,953 B2
(45) Date of Patent: Apr. 20, 2021

(54) PARTITIONING A DISTRIBUTED FILESYSTEM NAMESPACE

(71) Applicant: EMC IP Holding Company LLC, Hopkinton, MA (US)

(72) Inventors: Mayank Rajawat, Issaquah, WA (US); Barry Naujok, Lilydale (AU); Mohd Fahadullah, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 226 days.

(21) Appl. No.: 16/265,412

(22) Filed: Feb. 1, 2019

(65) Prior Publication Data
US 2020/0250137 A1 Aug. 6, 2020

(51) Int. Cl.
*G06F 7/00* (2006.01)
*G06F 16/13* (2019.01)
*G06F 16/185* (2019.01)
*G06F 16/182* (2019.01)
*G06F 16/16* (2019.01)
H04L 29/08 (2006.01)

(52) U.S. Cl.
CPC ............ *G06F 16/13* (2019.01); *G06F 16/166* (2019.01); *G06F 16/182* (2019.01); *G06F 16/185* (2019.01); H04L 67/06 (2013.01)

(58) Field of Classification Search
CPC .... G06F 16/185; G06F 16/182; G06F 16/166; G06F 16/13; H04L 67/1097; H04L 67/06
USPC ................................. 707/662, 740, 822, 722
See application file for complete search history.

(56) References Cited

U.S. PATENT DOCUMENTS

| 9,886,443 | B1* | 2/2018 | Gupta .................. G06F 16/188 |
| 2005/0027795 | A1 | 2/2005 | San Andres et al. |
| 2008/0046432 | A1 | 2/2008 | Anderson et al. |
| 2012/0185510 | A1 | 7/2012 | Desai et al. |
| 2013/0198474 | A1* | 8/2013 | Shaath ................ G06F 12/1466 |
| | | | 711/163 |
| 2013/0332660 | A1 | 12/2013 | Talagala et al. |
| 2014/0006465 | A1 | 1/2014 | Davis et al. |
| 2014/0310499 | A1 | 10/2014 | Sundararaman et al. |
| 2015/0242283 | A1 | 8/2015 | Simoncelli et al. |

(Continued)

OTHER PUBLICATIONS

Non Final office action received for U.S. Appl. No. 16/265,447 dated Jan. 19, 2021, 69 pages.

(Continued)

*Primary Examiner* — Md I Uddin
(74) *Attorney, Agent, or Firm* — Amin, Turocy & Watson, LLP

(57) ABSTRACT

The described technology is generally directed towards domains that data services can use to collect files of a global filesystem namespace into groups. A data service (a domain patron) creates a domain, e.g., for a particular directory, and a domain manager associates files under that directory with domain membership information. Thereafter, the data service can use the domain membership information associated with a file to determine whether to include that file in a data service operation. In one implementation the membership information is maintained in file metadata, facilitating fast and efficient retrieval of the information in near constant time. Exclusion from a domain, hard links, renames and alternate data streams are among the various aspects supported by the domain technology.

20 Claims, 20 Drawing Sheets

(56) References Cited

U.S. PATENT DOCUMENTS

2016/0210260 A1 7/2016 Case et al.
2016/0224580 A1* 8/2016 Jain ...................... G06F 16/134
2018/0246648 A1 8/2018 Venkat et al.

OTHER PUBLICATIONS

Dell EMC, High Availability and Data Protection with Dell EMC Isilon Scale-Out NAS, Sep. 2016 (Year: 2016).
Naujok et al., "Design of IFS Domains", 2016, pp. 1-50.
Rajawat et al., "PSA IFS domains", 2016, pp. 1-9.
Ballal et al., "IFS Domains-based Snapshots design", 2016, pp. 1-16.
Non Final Office action received for U.S. Appl. No. 16/265,176 dated Jan. 25, 2021, 15 pages.

* cited by examiner

PARTITIONING A DISTRIBUTED FILESYSTEM NAMESPACE

TECHNICAL FIELD

The subject application relates generally to filesystems, and more particularly, to adding a partition of a filesystem namespace and the files therein into a group, referred to as a domain.

BACKGROUND

A distributed filesystem such as OneFS® is designed to provide storage and client access to a very large number of files, on the order of up to billions of files arranged in a single hierarchical directory structure namespace, for example. Part of administering such a large, distributed filesystem is provided by data services, such as a snapshot data service, a quota data service, a deduplication data service, and many others that apply respective policies to the namespace.

A problem with such a large namespace is that different parts of the namespace need to have different policies applied to those parts, which can be a complex management problem from the perspectives of data services. For example, a part of the namespace available to a finance department likely needs different management policies from a part of the namespace reserved for an engineering department. Even within a department there are likely different policy needs, e.g., within a finance namespace, different namespace parts for payroll and billing file objects likely need to be managed differently.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
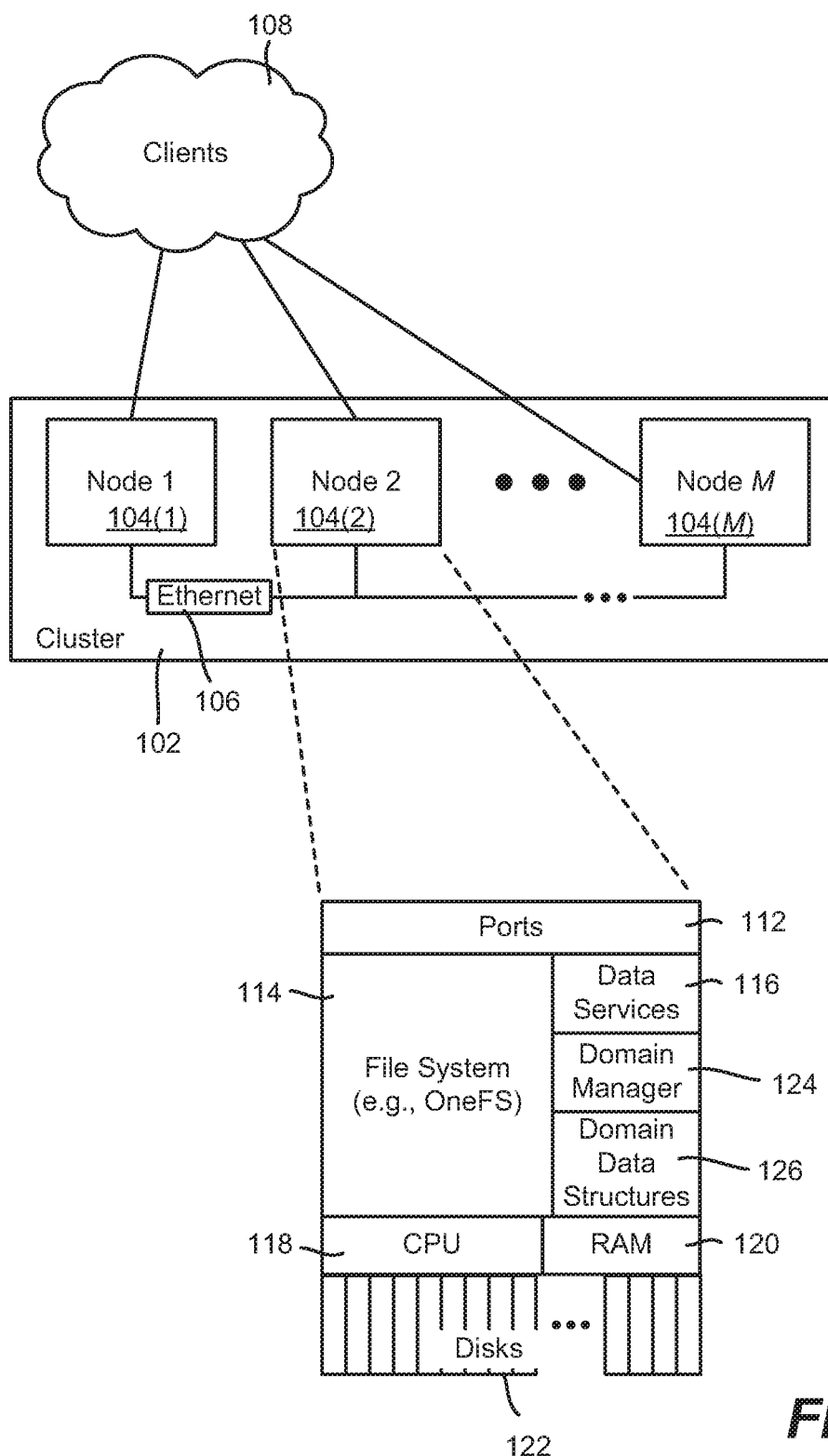
FIG. 1 is an example block diagram representation of a distributed filesystem including nodes, in which a domain manager maintains domain membership information for data services, in accordance with various aspects and implementations of the subject disclosure.

Various aspects of the technology described herein are generally directed towards a framework that manages the creation and maintenance of partitions of a namespace, referred to as domains, for use by any appropriate data service. As used herein, domains can refer to the partitions of a namespace, as well as a domain service of a filesystem that provides domain-related information, such as a set of domain identifiers that identify one or more domains of which a file object is a member.

In general, a data service (sometimes referred to as a domain "patron") uses the domain framework, e.g. accessed via an interface, to map a group of files to a domain. In one or more implementations, the mapping is at a directory level, in which files are grouped into a domain as a directory tree. A directory associated with a domain can be a newly created empty directory or an existing directory possibly containing an existing group of files. In this way, a directory or file object within that directory becomes a member of a domain.

Once a domain is associated with a file, a data service is able to use the domain framework to determine the file's domain membership, that is, to determine the file's associated domain or domains. The domains can be filtered for that particular data service, e.g., a snapshot data service that requests domain membership information receives snapshot-created domains, a quota data service receives quota-created domains, and so on. A significant feature of domains as described herein is that only one domain need be internally created for a single directory entry for any data service that needs the membership information starting at that directory. This saves significant time and resources for generating and maintaining membership information, compared to where each data service maintains its own grouping information.

By way of example, consider that a particular data service wants to know whether to include a file in a particular data service-related operation. The data service obtains the domain membership information associated with the file, and uses the domain membership information to determine whether this file is to be part of the data service-related operation. Using the same domain membership information associated with the file, a different data service can do the same thing with respect to one if its operations. A domain manager can filter the domain membership information based on which data service is requesting the domain membership information.

Moreover, the membership information (in most instances) can be rapidly returned to a requesting data service in near constant time. As will be understood, this is because each file and directory is tagged with the domain membership information in its metadata, e.g. in a file attribute for a file object. This is in contrast to other per-data service file grouping solutions that need to walk a directory hierarchy each time to determine whether the data service's pending operation applies to a given file.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

It should be understood that any of the examples herein are non-limiting, and that variations to the technology can be implemented. For instance, some of the examples are based on the OneFS® filesystem, which in general in one or more implementations comprises a distributed filesystem with a single filesystem namespace; however virtually any filesystem may benefit from the technology described herein. Moreover, the term "disk" or "disks" is used in many of the examples described herein, however it is understood that any data storage resource/storage device may be used instead of or in addition to disks. Thus, any of the embodiments, aspects, concepts, structures, functionalities or examples described herein are non-limiting, and the technology may be used in various ways that provide benefits and advantages in computing and filesystems in general.

FIG. 1 shows a distributed filesystem such as OneFS® comprising a cluster 102 of nodes 104(1)-104(M), in which each node is typically a server configured primarily to serve files in response to client requests. The nodes 104(1)-104(M) are coupled to each other via a suitable data communications link comprising interfaces and protocols such as represented in FIG. 1 by Ethernet block 106.

Clients 108 make filesystem-related requests to the cluster 102, which in general is configured as one large filesystem namespace; there may be on the order of billions of files maintained in a cluster, for example. To this end, a node such as the node 104(2) generally comprises ports 112 by which clients connect to the distributed filesystem. Example ports are provided for requests via various protocols, including but not limited to SMB (server message block), FTP (file transfer protocol), HTTP/HTTPS (hypertext transfer protocol) and NFS (Network Filesystem); further, SSH (secure shell) allows administration-related requests, for example.

Each node includes (or is coupled to) an instance of the distributed filed system 114 and data services 116. A CPU 118 and RAM 120 are shown for completeness; note that the RAM 120 may comprise at least some non-volatile RAM. The node includes storage devices such as disks 122, comprising hard disk drives and/or solid-state drives. Filesystem I/O (input/output), such as file object reads and writes may be to the local disk or to the disks of one or more other nodes; the physical location or locations of a filesystem object (directory or file, along with associated metadata) is generally transparent to the client.

As described herein, a domain manager 124 and domain data structures 126 facilitate the domain technology. Although not explicitly shown, it is understood that the filesystem 114, the data services 116, the domain manager 124 and domain data structures 126 are implemented in the RAM 120 or the disks 122, or a combination of both. Moreover, some of the components and/or part thereof can be per-cluster or per-multiple nodes rather than per-node; e.g., it is feasible to have a data service running on one node that operates on at least one other node.

When a domain is created on a directory, the directory itself and the nodes (descendants) under that directory need to be associated with that domain. To this end, a pre-existing directory tree is walked and tagged with the new domain identifier. For a directory already associated with one or more domains, including an empty directory, as new file objects (and subdirectories) are added to that directory, the new file objects and subdirectories automatically inherit the domain membership.

Figure 2:
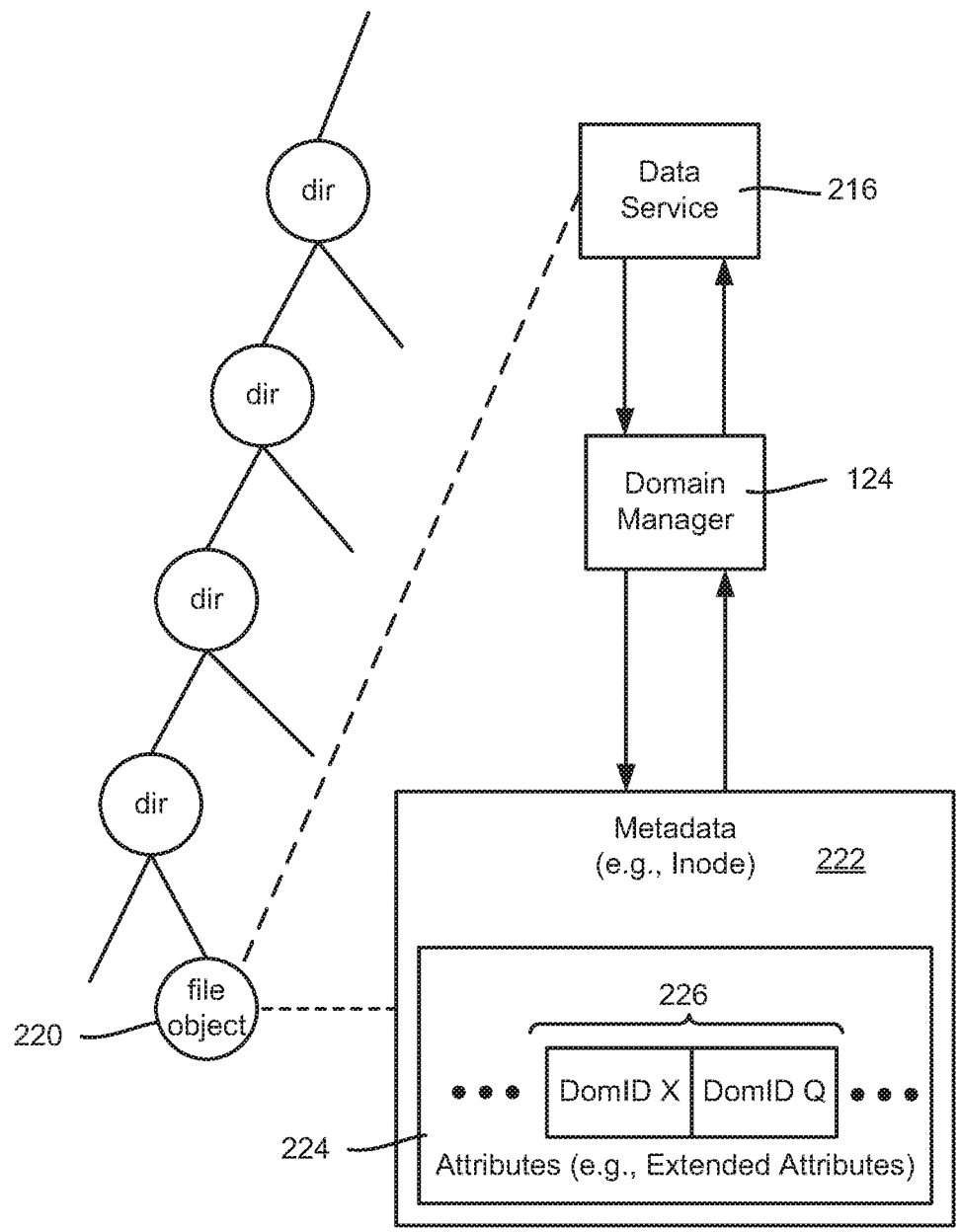
FIG. 2 is an example representation of associating domain information with metadata of a file object, in accordance with various aspects and implementations of the subject disclosure.

FIG. 2 shows an implementation in which a file object 220 is associated with domain membership information. In this example, metadata 222 (such as maintained in an inode (index node)) comprises various attributes/extended attributes 224, wherein an inode attribute comprises a dynamic attribute that can be set and read on an inode and can be of a varying length. The metadata includes a domain attribute comprising a dynamic inode attribute set on a file to indicate the file object's domain membership. As shown in FIG. 2, a domain attribute can hold one or more domain identifiers 226 (e.g., DomID X and DomID Q, where X and Q represent, for example, 64-bit identifiers that are unique at least within the filesystem). Although not explicitly shown, directories can also be associated with domains through one or more domain identifiers.

Because of the direct association via the metadata 222, the domain membership comprising the one or more domain identifiers 226 is thus (almost) immediately available to a requesting data service 216 in near constant time. The domain manager 124 provides this domain membership information on request from the data service 216, and also provides interfaces or the like for a data service to create domains, delete domains, and so forth as described herein. Note that an exception to immediate constant time retrieval of the domain membership information occurs when a new domain is created on an existing directory, and the directory tree is being walked and tagged with the new domain identifier as described herein. Note that an unmarked file is a file with its domain attribute not (yet) marked with any domain identifier.

Figure 3:
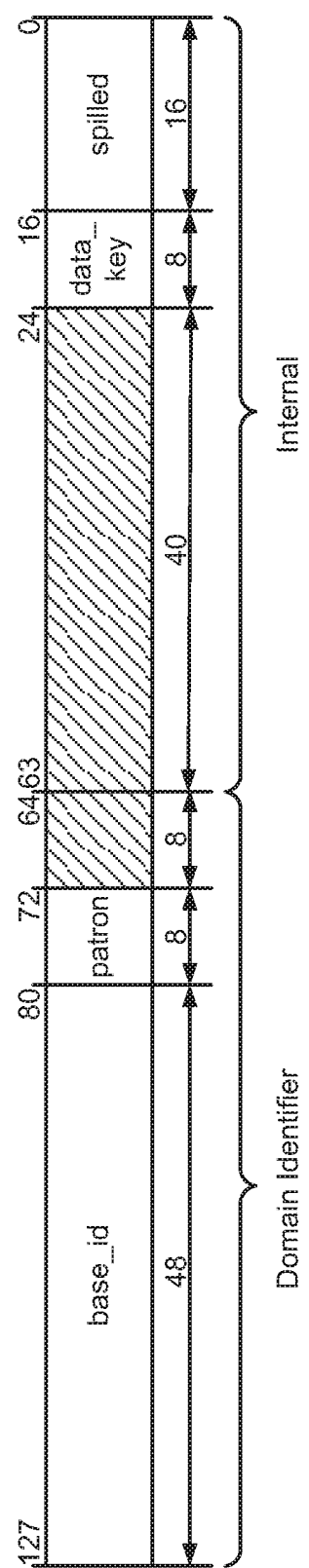
FIG. 3 is a representation of example components of a key to a domain data structure, in accordance with various aspects and implementations of the subject disclosure.

Each data service (domain patron) that needs membership information from a particular directory is referred to herein as a "domain instance." Each domain instance is represented by a domain identifier (e.g., a 64-bits number, for brevity sometimes referred to as a "DomID"). FIG. 3 shows an example "key" data structure including a portion that serves as the domain identifier.

Information common to more than one domain instance that is rooted at one directory can be stored in a common location for the instances. Such a common entry is referred to as the domain base entry (or "DomBE" for brevity). The domain base entry contains data representing the owning root directory's Logical Mode Number (LIN, a cluster-unique identifier for a file object), along with data that indicates whether tagging is in progress or has completed, data that indicates whether one or more nested domains (described below) are undergoing tagging, and a reference count for instances and the owning root directory.

In one or more implementations, domain information is stored in a domain-related data structure, which in one particular implementation comprises a dedicated System B-Tree (SBT). At various times, domain patrons will need domain-related information, such as during their interception of filesystem operations, and therefore will need efficient access to patron-specific internal data. As shown in the example of FIG. 3, a key (e.g., 128 bits) for each SBT entry comprises the exposed 64-bit domain identifier and a 64-bit internal sub-key to allow the management of discrete data blobs as needed by patrons, domain management and the I/O path. More particularly, in the example of FIG. 3, each entry in the domain SBT has such a 128-bit key, with the key divided in half with the first half being the public domain identifier, (DomID, public to the filesystem and other components thereof), and the second half for internal usage, e.g., for separating data used for different purposes in the domain manager and for supporting blobs of data larger than a single SBT block. In FIG. 3, the hashed/shaded portions are reserved, e.g., for possible future use. In one or more implementations, SBT key zero is reserved for global domain information.

Figure 4:
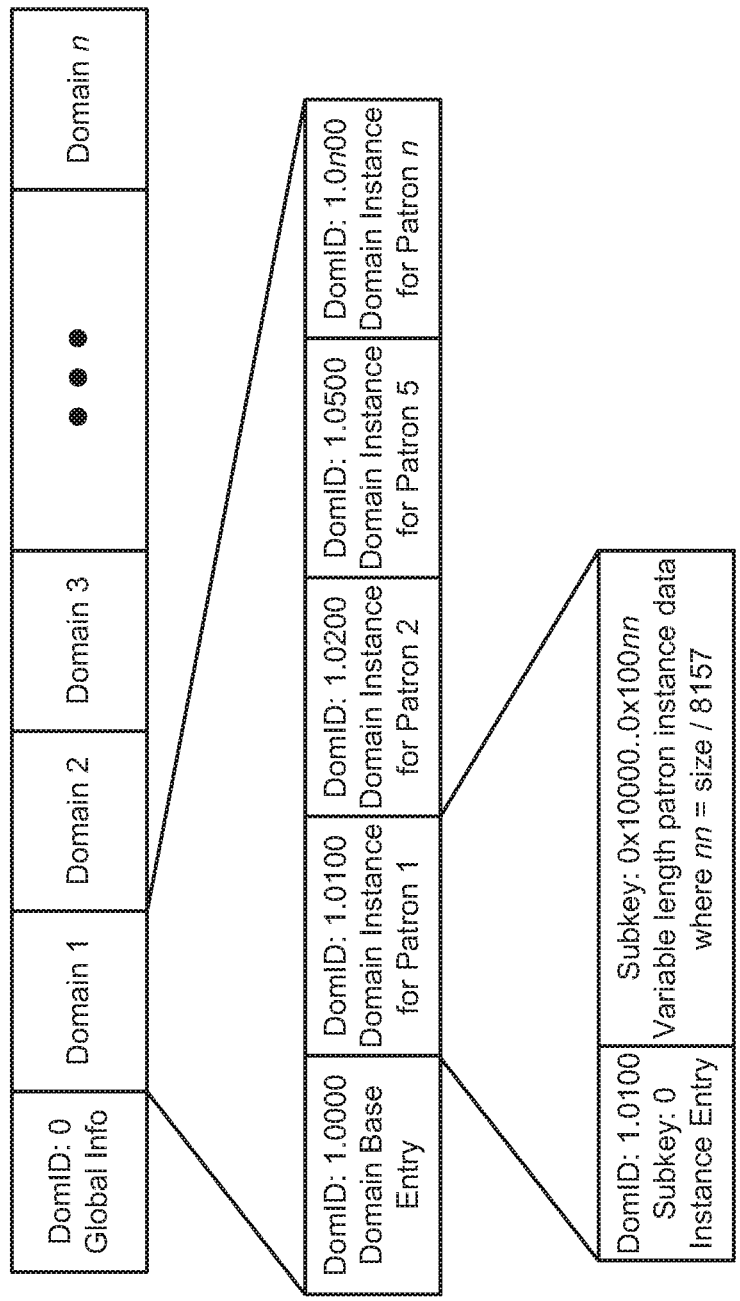
FIG. 4 is a representation of an example domain system data structure layout, in accordance with various aspects and implementations of the subject disclosure.

The logical layout of the various domain base entries, instances and patron data in the SBT is shown in FIG. 4. In this way, domain patrons store data in the SBT that is used within the I/O path. In one or more implementations, patron data can be limited (e.g., to 1 MB). In this implementation each SBT leaf can hold up to 8157 bytes, and thus multiple leaves are used to store more than 8157 bytes. Note that other domain patron configuration and miscellaneous data can be stored elsewhere, as too much data in the SBT likely will degrade the performance of the overall cluster.

In sum, the domain identifier comprises a unique numeric identifier, which also helps with the lookup in the domain's SBT space. The base domain identifier is a domain identifier that has no patron instance set representing the domain's common properties and state which is stored in a Domain Base Entry (DomBE); note that instances to a domain have a common base entry that will maintain the properties and status common to all domain instances, such as the directory LIN to which it is rooted, the number of instances, and child domain instances that may refer to this domain base entry. Each DomBE has a corresponding base domain identifier.

Thus, a patron's instance data is stored in the domain's SBT. As previously shown in FIG. 3, the domain identifier uses the most significant 64 bits of the key while the least significant 64 bits are divided into sub-sections, most being reserved. The lowest 8 bits of the key are used to index data in the SBT. The data can be read, and written to, transactionally as one big blob. Writes can append to the end of the blob. An iterative read of the data can be performed, which has the possibility of changing unless a suitable lock is held for the duration of the read.

Figure 5:
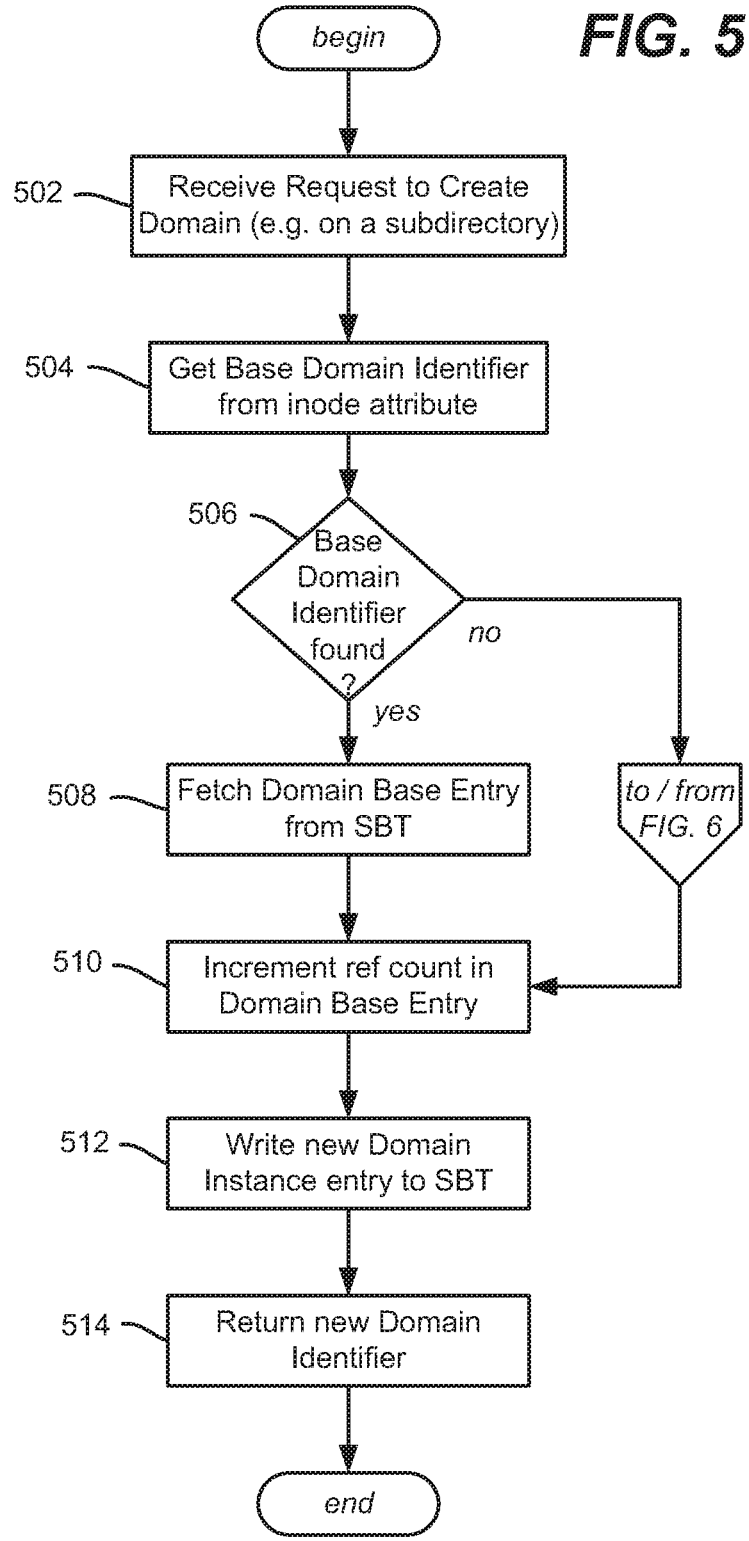
FIGS. 5 and 6 comprise a flow diagram showing example operations related to creating a domain, in accordance with various aspects and implementations of the subject disclosure.
Figure 6:
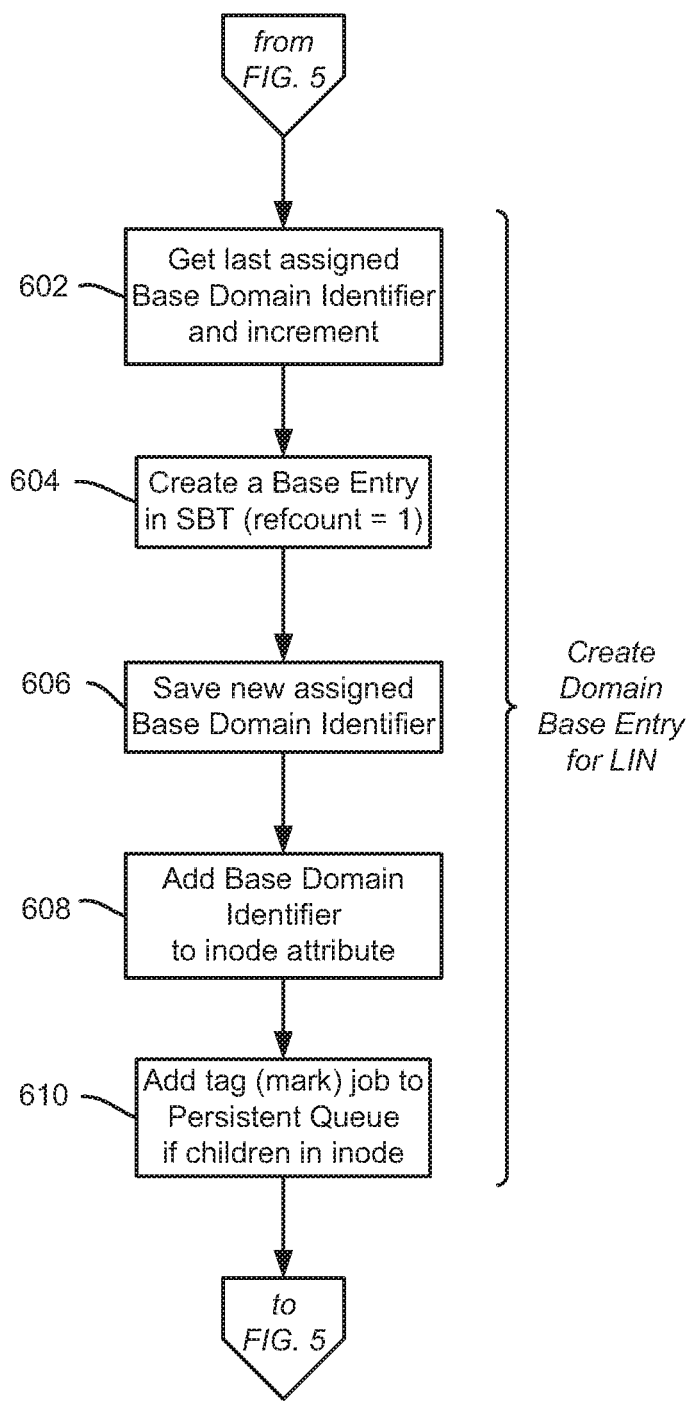

Turning to aspects related to domain creation, domain instances are created on demand by domain patron implementations, as determined by the patron implementation. As represented in FIGS. 5 and 6, the domain manager performs various operations with respect to creating a domain instance as requested by a patron (operation 502) on a directory. Operations 504 and 506 check if an existing DomBE exists for that directory. If no DomBE exists, operation 506 branches to operation 602 of FIG. 6 to create a new base entry in the SBT. Otherwise operation 508 retrieves the DomBE from the SBT at operation 508, and continues to operation 510 as described below.

If a new base entry needs to be created, operations 602, 604 and 606 of FIG. 6 operate to assign a new base domain identifier, including setting the reference count for the owning directory and saving the newly assigned base domain ID. Operation 608 adds (tags) the directory with the new base domain identifier. Operation 610 queues a job to tag the directory tree (tagging is described below), and the new entry can be committed. Note that queuing the job to tag the directory tree (at operation 610) can be skipped if the directory entry is empty and the patron allows the path leading to the domain to be renamed. In one or more implementations, patrons are allowed to deny a path rename, as described herein. The process then returns to operation 510 of FIG. 5.

Operation 510 increments the reference count in the DomBE for the new instance, and operation 512 creates an entry in the SBT for the new domain instance for the patron. Operation 514 returns the newly assigned domain identifier incorporating the patron instance.

Note that some patrons allow domain instances to be nested within each other. For example, snapshots can be taken in any directory, which means that a snapshot patron instance can be nested. Other patrons that allow nesting may override and/or inherit parent domain policies. To support these, a depth field is established in the DomBE, which tracks the path component depth of each domain relative to the filesystem's mount-point. Non-nestable patrons and nesting checks are described below.

When a new DomBE is created as described with reference to FIGS. 5 and 6, the owning directory is directly tagged with the base domain identifier. As described above with reference to FIG. 2, in one or more implementations, the tags for file objects are stored in an extended inode attribute. This inode domain attribute contains an array of base domain identifiers representing the known domain membership for the file object. If the owning directory for the domain is not empty when the DomBE is created, a job is queued (operation 610) to allow the children of the directory to be tagged in a background job.

In general, for domain operations that take a while to execute and cannot be performed inline as a single kernel operation, lengthy operations are handled in the background.

In one or more implementations, a job engine job breaks the operations into small pieces to be executed across the cluster (e.g., from user-space). Example operations include tagging (sometimes referred to as "marking") new domains created on an existing directory tree, re-tagging file objects that have been renamed to a different domain, and cleaning up the SBT when a domain has been deleted.

To let the domain tag job know when it needs to perform an operation, the domain manager (e.g., in the kernel) uses a persistent queue to queue the operations for the user-space domain tag job to read and initiate the jobs. A separate monitoring daemon can be used to monitor the persistent queue and start the domain tag job.

With respect to tagging, because a directory can contain thousands of existing file objects when a new domain is created, it is not practical to tag all child nodes at the domain creation time, and thus in one or more implementations, a background job is created for tagging the child nodes, which can take hours or even days to complete. To this end, the domain manager (kernel) thus adds a tag operation to the persistent queue, which a user-space daemon detects, and starts a domain tag job that walks the entire directory tree, tagging each file object that is encountered with the new base domain identifier. Note that when a domain is created on a pre-existing directory, full domain membership information potentially can take a long time to be established and possibly incur expensive parent walking and writing operations during normal I/O activities. Often multiple patrons will need domain membership starting at the same directory, typically a filesystem export point. The domain technology described herein takes advantage of this by only walking and tagging domains for a directory once. A domain is considered ready when all the files are marked.

In general, a patron often cannot wait for a tag job to complete. That is, in practice, a data service needs to determine a file's membership in-line with the data service operation, generally referred to as "instant membership." As described herein, during tagging, the membership determination can also be performed on-demand by having the domain manager walk up the file's parent path until the domain manager has discovered the domain(s) of which the file is a member. The domain manager also writes the membership information to the file's metadata, so that on a subsequent accesses to the file, the domain manager will not have to walk the parent path again.

Figure 7:
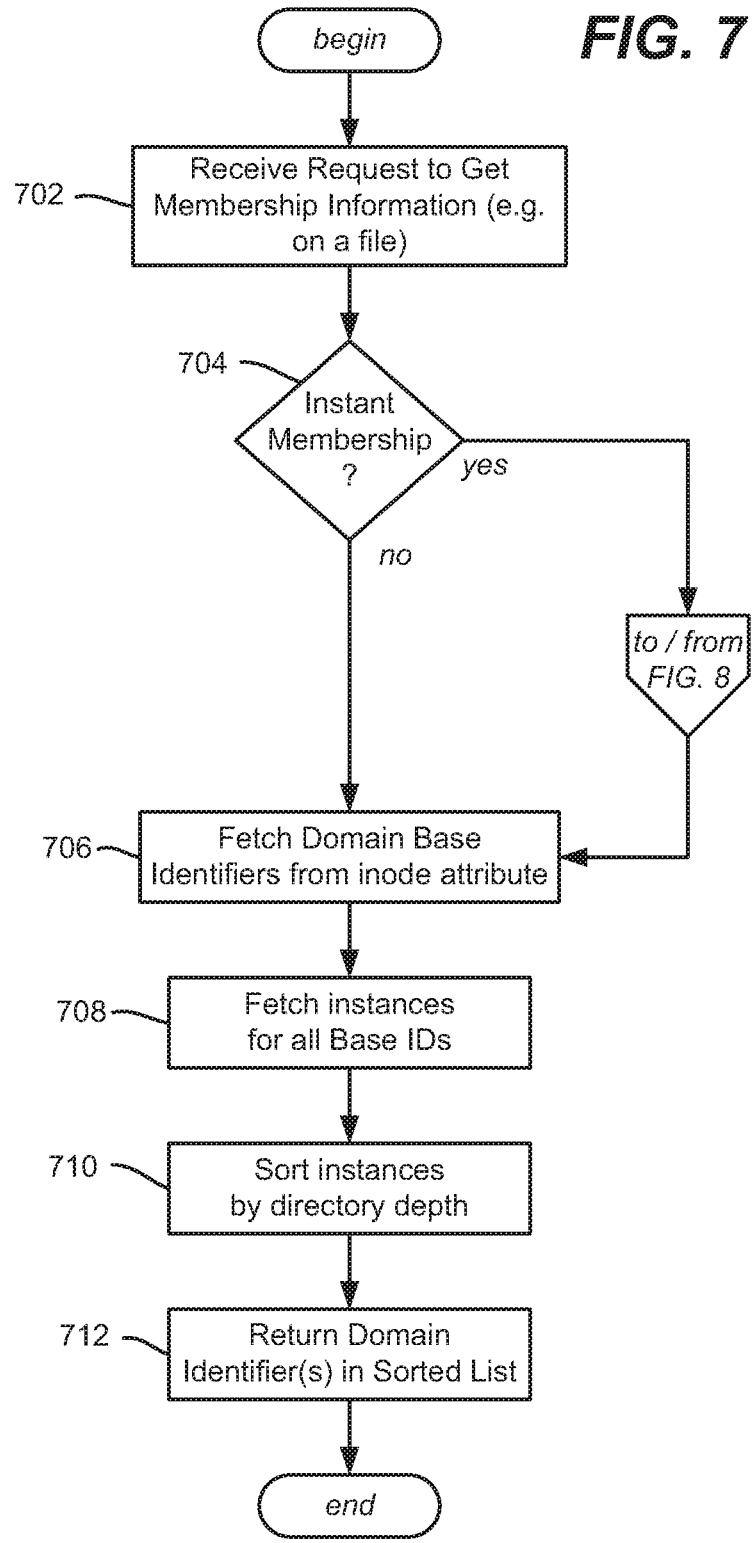
FIGS. 7 and 8 comprise a flow diagram showing example operations related to returning domain membership information to a requesting entity, in accordance with various aspects and implementations of the subject disclosure.
Figure 8:
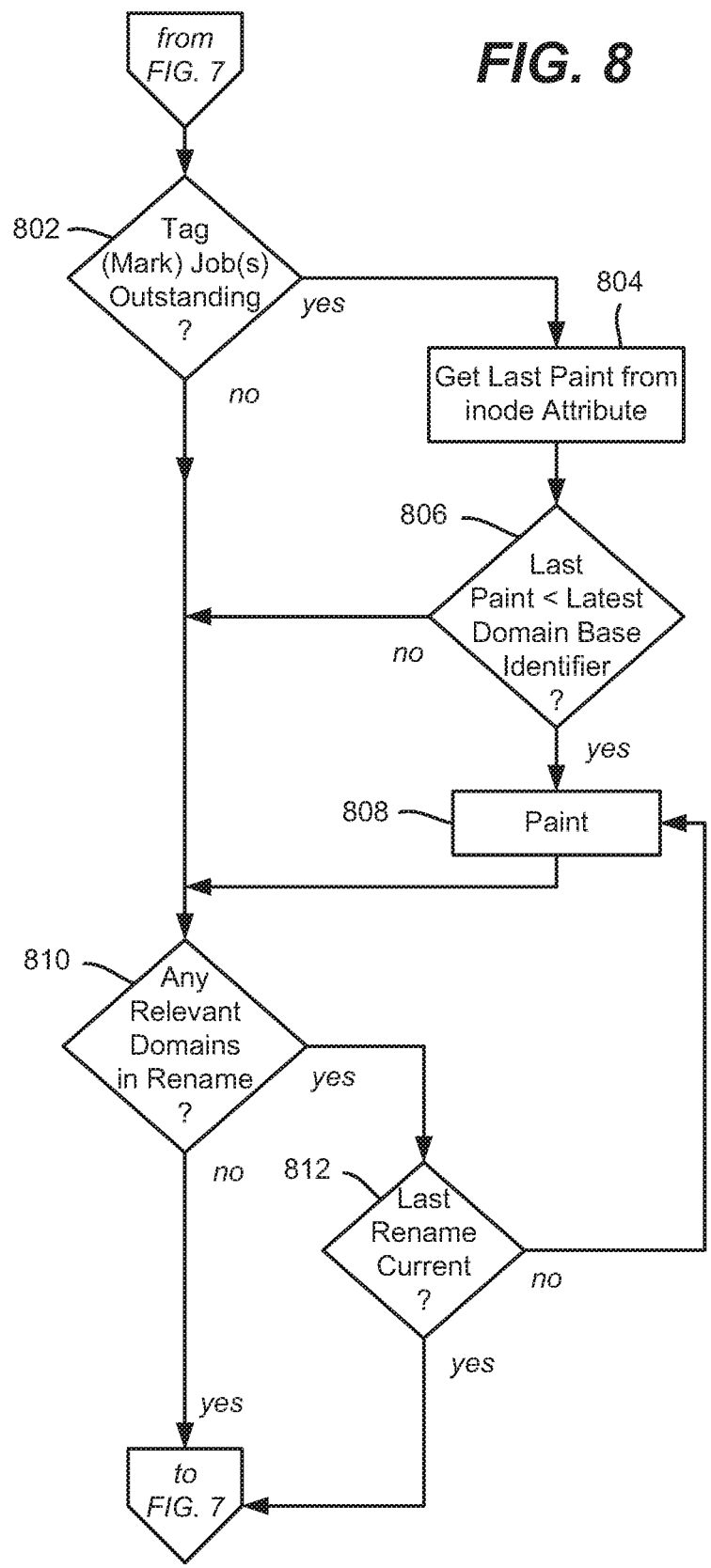

More particularly, when the membership for a file object needs to be obtained, usually in the context of a filesystem operation and a patron request, the operations shown in FIGS. 7 and 8 are performed in one or more implementations. Operation 702 represents receiving the request to get the membership information. Operation 704 evaluates whether the requesting patron needs instant membership information; typically this is the situation, and thus in one or more implementations, operation 704 need not actually perform an evaluation, and instead the process can directly continue at operation 802 of FIG. 8 (the "yes" branch can be automatically taken). For now, consider that instant membership information is not needed, or the operations of FIG. 8 are performed to verify that domain membership is up to date and/or make the domain membership up to date as described below, whereby the process continues at operation 706.

Operation 706 retrieves the base domain identifiers from the inode's domain attribute, and operation 708 retrieves the associated domain instances from the SBT. Operation 710 sorts the instances by the relative directory depths (DomBE's depth field) to allow the caller to determine nested domain hierarchy. Operation 712 returns the sorted list to the caller.

Returning to the concept of instant membership, if a patron or domain operation needs instant domain membership information, such as for a snapshot patron or a nesting check (described below) during domain creation, then the domain manager can determine if the inode's membership information is up to date, and if not, paint (walk up the parent chain to figure out properties of the parent chain) as appropriate to update the domain membership information. Example operations are summarized in FIG. 8, beginning at operation 802 of FIG. 8, which evaluates whether one or more tag jobs are outstanding. If so, operation 804 obtains a last paint (a counter) value from the file's inode, which, along with operation 806, determine if the last paint value is current. If not, operation 808 paints as described herein, that is, walks up the parent path until an up-to-date node is found with respect to domain membership information, and thereby is used to update the domain membership information of the file object. Additional details of painting are described herein with reference to FIG. 9.

If there are no tag jobs outstanding, or if the node had up-to-date membership information at operation 806 (or now has up-to-date membership information following painting at operation 808), operation 810 is performed. Operation 810 evaluates whether there are any relevant domains undergoing a rename process (described below). If so, operation 812 evaluates whether the last rename is current, and if not, branches to operation 808 to paint. The process repeats as needed until there are no relevant domains in a rename state and/or the last rename is current, and returns to operation 706 of FIG. 7 as described above.

Additional details with respect to instant membership include, in one or more implementations, that a structure is stored (e.g., as the first entry) in the SBT recording the global state of the domain manager. If there are no outstanding tagging jobs to be completed, then it is assumed that every inode on the filesystem is up to date and can just return the current set of domain identifiers set on the Domain Attribute. If instead there are outstanding tagging jobs, then another "last paint" inode attribute is used to record the last time the domain membership was last updated on the inode. If the attribute does not exist or the attribute's global ID value is less than the global last base ID value, which is changed when creating a new DomBE, then it is assumed the membership on the inode is out of date. If the domain membership information is out of date, then a painting operation is performed to update the membership immediately before returning the list of domains of which the file object is a member.

If the inode's last paint global value is current, the associated "rename" flags are checked to determine whether any sub-directories in their domains have been renamed to a location outside the domain. If so, a rename generation number is checked against the global rename generation counter. If the last paint value is out of date, the inode undergoes a painting operation to update the membership of the file object. Once the painting has been done, the instances are fetched from the SBT, sorted by depth and returned to the caller.

For root directory domains, an exception can exist, as it can be assumed that files in the filesystem are members of any root directory domains. Thus, when domain membership information is fetched, instances for the root directory are also be fetched. The base domain identifier for the root domains is 0.0000, which means that domain instances created on the root directory do not need to tag any files within the filesystem and are always "tagged" and "ready". For subdirectories to have policies different from the policies defined in the root domain, such subdirectories need to override the policies with a new domain instance or create an "exclusion" instance (described below) that applies to a root domain instance.

When a domain instance is deleted, the SBT entry for the instance is (virtually) immediately deleted and a domain tag job is queued in the persistent queue to delete other SBT entries that may exist for that instance. The reference count in the corresponding DomBE is decremented. As the DomBE has a reference for the owning root directory, a DomBE will be removed when the owning directory itself is removed. This has a number of advantages, including that if an instance is removed and then another instance is created, a domain tag job is not needed to be started, as the membership is always up-to-date. Further, untagging is not needed, because the owning directory itself has to be empty before it can be removed. This further avoids cross tree-walking of a tag/untag job on the same directory being started shortly after one another, with associated persistent queue and job engine management.

Domains interact with filesystem operations at various points, including painting (e.g., operation 808 of FIG. 8) as described above, that is, when current membership information is needed for a file object in a domain that is still being tagged due to domain creation and/or a rename across domains. For filesystem operations this can include creating a non-nestable domain instance in which the new domain is being created in another domain that is still being tagged; in preparation for a rename operation (described below); and during modification to files where a patron requires accurate and current membership information. The concept of painting generally relates to snapshots, which can walk the inode's parent chain to figure out whether to snapshot a file object. The painting operation for domains works with the base domain identifier.

Note that painting can be done in one or two passes for a single membership check, e.g., on pass for a domain still in the tagging state, and/or another pass if any of the domains of which the inode is a member is in a rename state.

Figure 9:
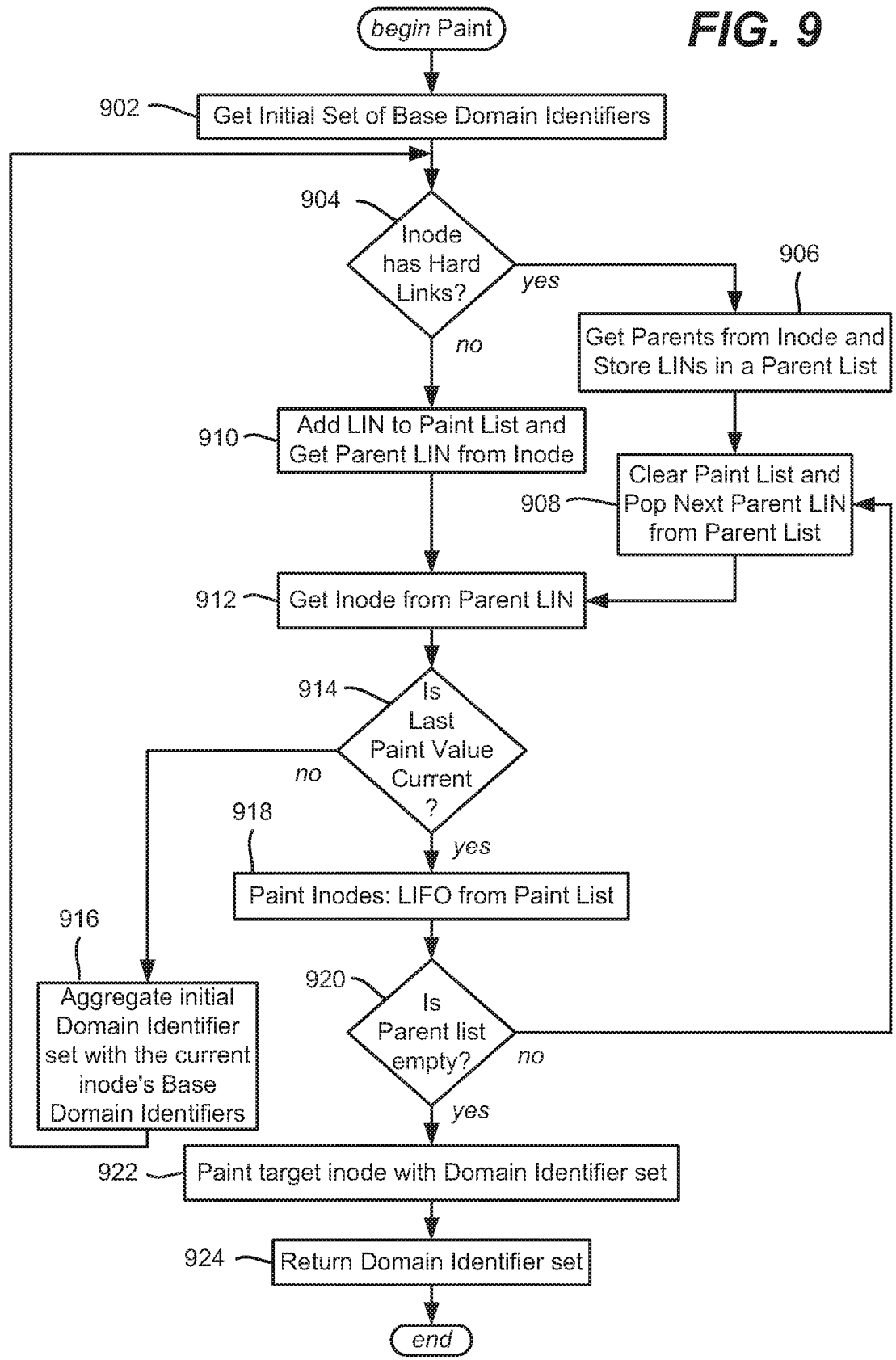
FIG. 9 is flow diagram representation example operations of painting attribute information with respect to domains, in accordance with various aspects and implementations of the subject disclosure.
Figure 10:
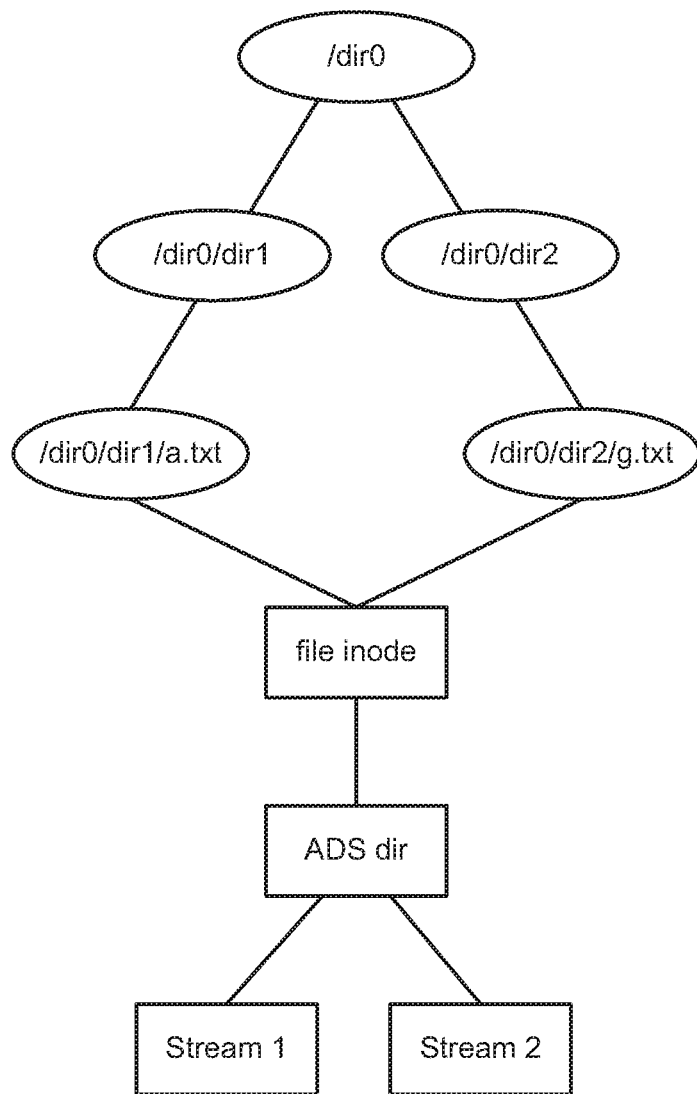
FIG. 10 is an example representation of paint paths relative to domains, in accordance with various aspects and implementations of the subject disclosure.

FIG. 9 shows additional details of example painting operations, including walking up the parent tree, where "up" refers to traversing the path from the target inode (the target inode refers to the inode for which instant-membership information is being fetched)) towards the root directory, which can be done utilizing shared locks. FIG. 10 shows an example of such paths, including hard links ("hard links" refer to a scenario where a file has more than one path reference to it from multiple directories) and two alternate data streams.

In general, painting comprises a process used by various modules to walk up their ancestor chain to figure out what policies apply to them. This is costly in real time and deadlock prone. Domains uses painting occasionally, but cuts down on the impact of conventional painting because domains are created infrequently, so the information on a file's inode does not become stale easily. Further, domain creation triggers a background task (job) to update the inodes in the background, thus proactively updating membership in case of a domain create that can result in membership change. Still further, painting as described herein cuts down the number of affected files by updating the generation counter only for the ancestor of the domain root, whereby other files that do not share that ancestor, will not be affected.

After retrieving the initial set of base domain identifiers at operation 902, operation 904 checks for multiple hard links (there are multiple parents) to the inode, e.g., whether the inode is a directory or is a file with a link count that represents a hard link. If not, operation 910 adds the logical inode number (LIN) of the inode to a paint list, and gets the parent LIN form the node, where the paint list comprise a stack or other suitable data structure used to collect LINs for the traversal up the path, and then used for painting back down to, but not including the target inode; ("down" refers to the direction of the path from the root inode to the target inode).

If instead at operation 904 hard link(s) are detected, operation 904 branches to operation 906 to get the next parent logical inode number (LIN) and build a parent list to be used as to determine a next parent (operation 908) for use at operation 912. A parent list (e.g., a stack) is thus used if a file with multiple hard links is encountered, where the parent list stores a set of LINs for each parent inode, so that each parent path is followed to obtain complete domain membership information. Note that operation 908 also clears the paint list and pops a (first, and then next as needed) parent LIN from the stack.

Operation 912 fetches the LIN's inode, which is a parent inode. Operation 914 evaluates whether the inode's relevant last paint value (which records when an inode was last updated (relative to global ID or rename generation) so that path traversal need not always go back to the root inode) and if not, proceeds to painting (LIFO, last-in, first-out) at operation 918. Note that in one or more implementations, the root inode is always current, whereby the process will always stop traversing at the root inode. Otherwise, an end-of-traversal condition has occurred, and operation 916 aggregates the initial domain identifier set with the current inode's base domain identifier and returns to operation 904; note that the domain identifier set comprises the full set of base domain identifiers found during the path traversal for target inode parents, and is used for painting the target inode and is used for the membership query result.

Operation 920 is performed to process any other parents until the parent list is empty, at which time operation 922 paints the target inode (merges in the inode's current domain membership for the final domain list for the target inode). Operation 924 returns the domain identifier set.

Note that a membership check can be done for an alternate data stream (ADS) which is a child of a file inode. This means that following operation 916, the hard link check in operation 904 is performed through each iteration; however the number of times a file with a link value greater than one can only occur once in the entire path traversal. In such a situation, the target inode comprises the file holding the ADS and subsequent walks need to start at the hard link file, and not the original ADS inode. In one alternative, ADS inodes can have the domain attributes set; in another alternative, the domain attributes can be fetched on demand from the owning file inode. Note that the tree-walk job engine module does not traverse alternate data streams.

With respect to painting the domains back down the walked path, once the parent tree has been walked, the domain manager attempts to paint the updated domain information back to the inodes in the paint list. The domain manager starts painting at the inode closest to the root and works back towards the target inode. The painting down direction acquires the exclusive locks in the same order as a lookup operation takes locks, which prevents deadlocks with lookups. As the paint starts near the top of the directory tree, the domain set for painting is rebuilt from the start within the painting operation and then discarded at the end.

Because the walk up operations result in a full list of domains the traversal has encountered being maintained, failing to acquire a write lock will not stop the membership gathering operation. Thus, for painting back domain membership, with a new empty domain set, the process fetches the domain set from the inode at which the parent walk has stopped. This will be current, as it is either the root inode or has current membership information. The process open the next inode from the LIN paint list generated during the parent walk with an exclusive lock; if the inode cannot be opened, the painting operation stops. The process fetches the inode's relevant last paint value and makes sure the value has not been updated during the walk; if the value is current, painting stops. The process gets the inode's domain membership information and adds the membership information it to the domain set. In a transaction, the process writes the domain set and current global value to the inode in the appropriate attributes. The process returns to open the next inode, and so on, until the paint list is empty.

If hard links are encountered during the parent tree walk, a list of parents is saved in a parent list. Painting traverses each parent path to get the full domain membership for the target inode. To continue gathering domain membership information from the next parent in the parent list, the process clears the paint list, pops the next parent LIN from the parent list and returns to attempt to operation 912 of FIG. 9 (walk up the parent tree) as described above". Hard links should only ever be encountered once during a full traversal.

When an inode is created for a file, directory or alternate data stream in the filesystem, the inode immediately inherits any domain identifiers from its parent domain attributes. The last paint value attribute is also copied from the parent. Painting does not occur for the parent unless it is in a domain that has an instance needing instant membership at a time during which the domain is still being tagged.

If a hard link is created to an existing file, the hard link also adds the domain membership set from the new parent to the existing set of domains on the file's domain attribute. The last paint value is not copied in this case. Symbolic links are a form of inode creation and follow the inode creation operations.

With respect to unlink of a link, when a file object is deleted, first, before a transaction is started, the domain manager is notified. If there are any outstanding tagging operations, and there is in a domain where a patron requires instant membership information, the domain manager performs a painting operation. If the file object that is unlinked is the owning directory for a domain, then the reference count for the DomBE is decremented; if zero, the DomBE and the domain instances are deleted from the SBT. The base entry can be deleted as part of the unlink transaction, and the removal of the instances and associated SBT subkeys for the instances can be queued for processing by the domain tag job.

Optimizations to reduce painting are feasible, to minimize the impact of painting due to an instant ready domain. As one example, pending tag jobs sometimes can be combined into a single task. Further, a last paint ID attribute can be set on a file to indicate when it was last painted in relation to domain creation; this will allow a file to stop painting once its domain information is current. A last rename id attribute can be set on a file to indicate when it was last painted in relation to a rename requiring painting; this value may be compared against a per-domain rename identifier which is monotonically incremented whenever a rename affects a domain. The monotonic counter can also be made global. Opportunistic paint down also can paint down on the directory tree; although not strictly necessary as the domain tag job will eventually catch up, with a large dataset and a lengthy domain tag job, opportunistic paint down can help.

The first file in any domain that hits a directory which is not nested under the new domain gets tagged with updated last paint. The rest of the files in that domain do not need to paint, even if their last paint attribute is not valid. Also, an asynchronous process proactively can paint domains roots, thus figuring out which domains are not nested under the new domain.

The files in the sub-tree affected by the new domain will still need to use the on inode last paint attribute to stop painting. Any sub-domains will need to continue to paint unless the files in the sub-domains have an up-to-date last paint attribute. This allows domain membership information to be used to limit painting; the global impact is minimal.

Directories can be tagged, on the assumption that in a typical dataset the number of files vastly outnumbers the number of directories. This will allow a file to get its membership from its immediate parent.

Figure 11:
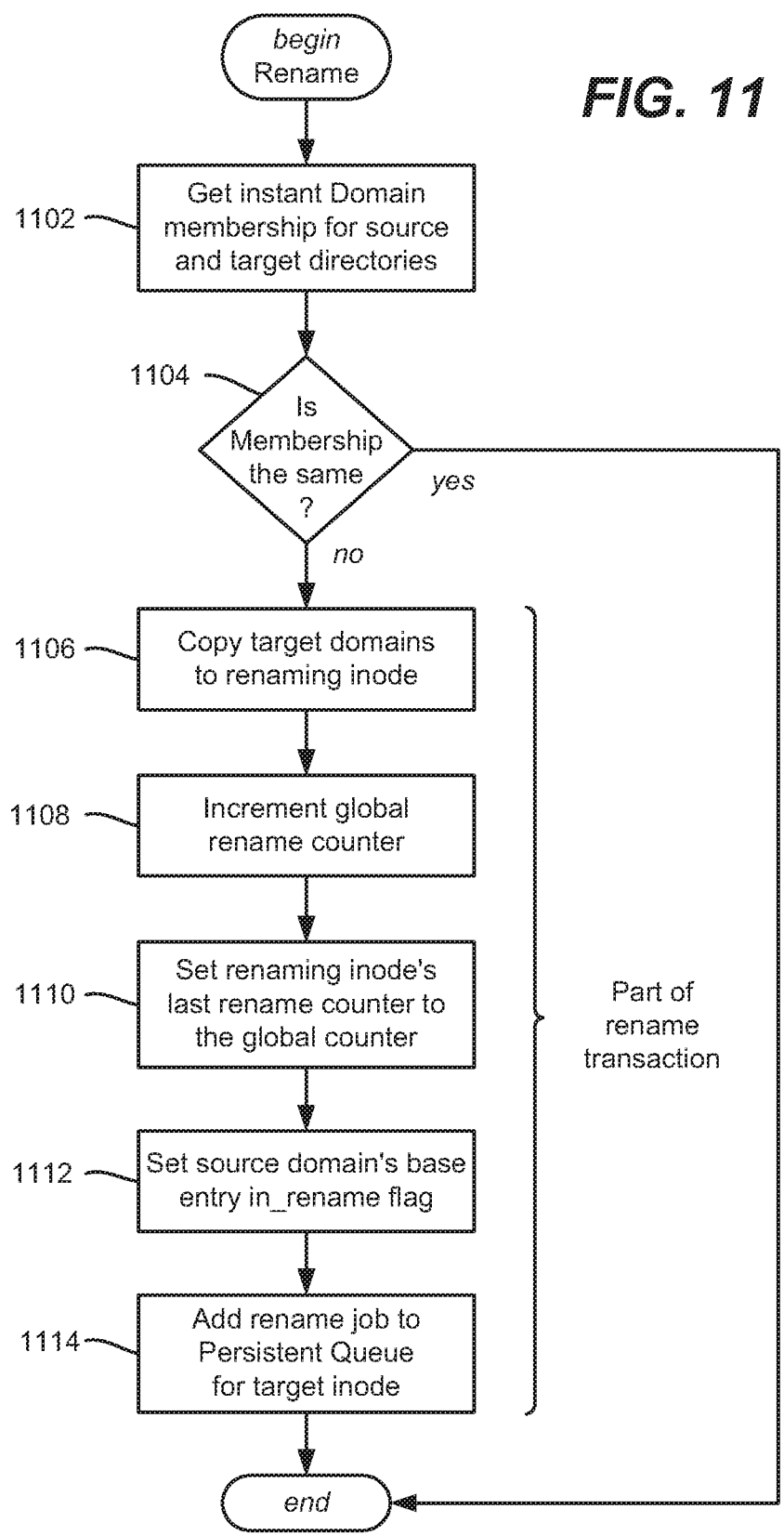
FIG. 11 is a flow diagram comprising example operations related to a rename operation with respect to domains, in accordance with various aspects and implementations of the subject disclosure.

Turning to FIG. 11 and aspects related to a rename operation, when a directory is renamed to a location outside its current domain, the rename operation affects the directory's membership and its children. Domains need current membership information on both source and destination directories, which may invoke painting operations. If the source and destination directories have the same domain membership, as obtained at operation 1102, then such operations can be skipped (e.g., via operation 1104 of FIG. 11).

As part of a rename transaction, the domain manager performs (operation 1106) copying the target directory's domain set to the inode being renamed, while not losing any domain that is rooted on the inode being renamed. Operation 1108 increments a global rename generation counter. Operation 1110 updates the rename inode's rename generation value, which is part of the last painting attribute, to the match the new global rename generation counter.

Operation 1112 updates the source domain's DomBE to set a rename flag, which causes the children to paint. Operation 1114 queues a domain tagging job, by adding the renaming inode to the domain tagging job's persistent queue.

When a directory is renamed, and the directory is an ancestor of one or more domains, a process is performed for each domain under the directory. The process checks that the final result will not have non-nestable patrons being nested within each other. The depth field in the DomBEs is updated to the new depth. For any exclusion instances within the directory being renamed, (where exclusions refer to excluding a node from domain membership), the exclusion instances are checked to ensure that they are still nested within the domain instance to which the exclusion applies. If the exclusion instance is not within its domain instance, the exclusion instance is deleted.

Figure 12:
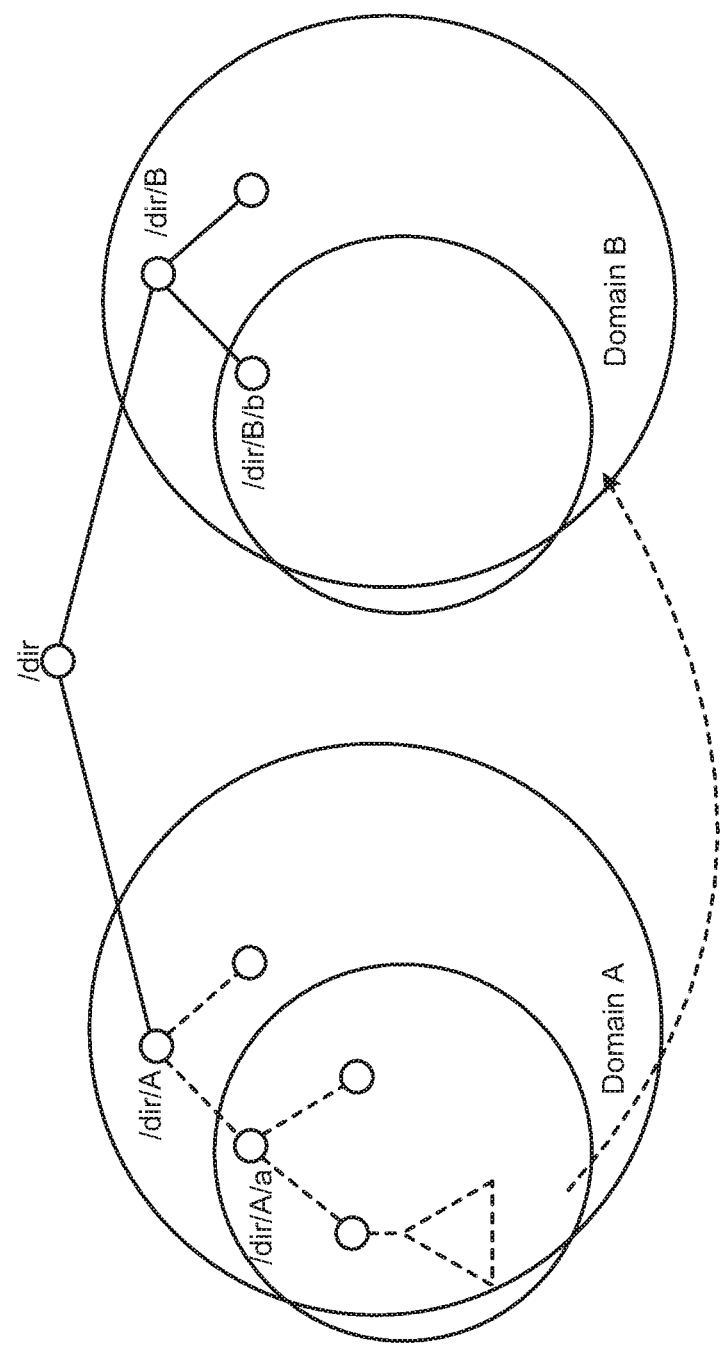
FIGS. 12-14 show various example states related to a rename operation, in which the source and destination of a rename root (e.g. a directory) are located in non-intersecting (non-overlapping) domains, in accordance with various aspects and implementations of the subject disclosure.
Figure 13:
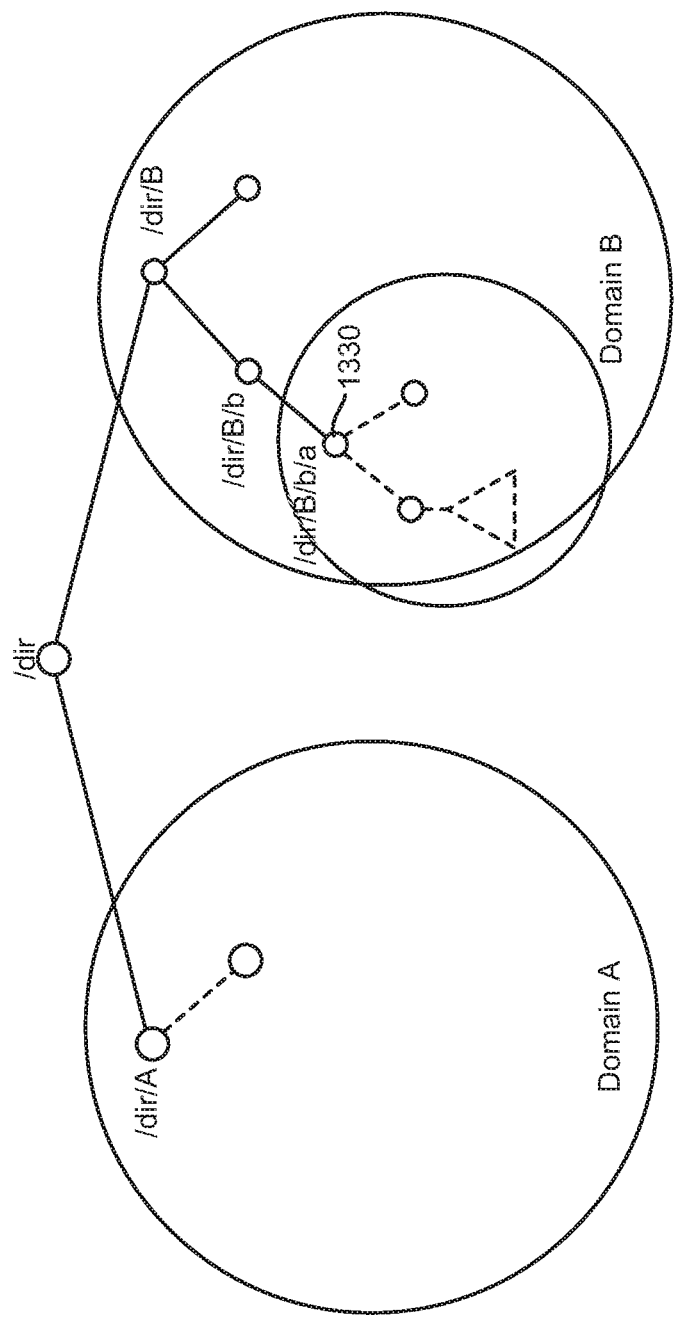
Figure 14:
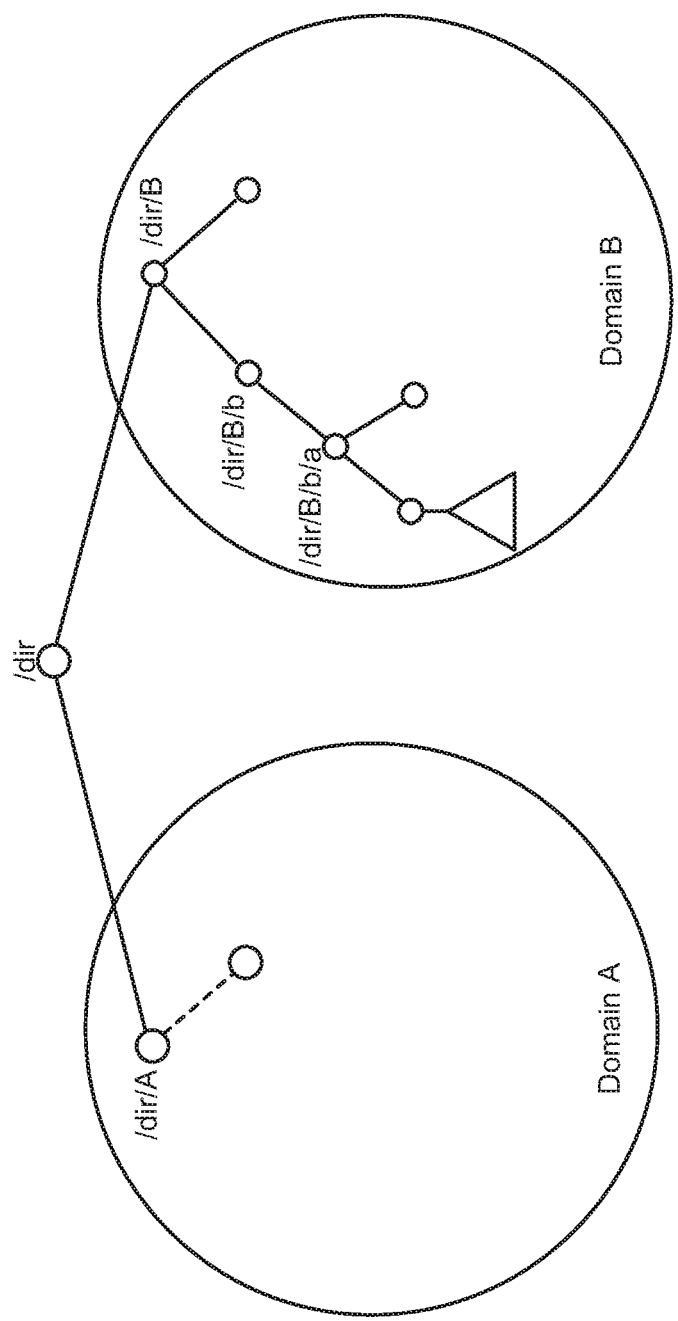

By way of example, FIGS. 12-14 depict an example of a rename operation where the source and destination of a rename root (e.g. a directory) are located in non-intersecting (non-overlapping) domains. In this example, both domains contain patrons that require instant membership. FIG. 12 shows a state before a rename operation corresponding to renaming/moving a directory /dir/A/a (represented by dashed lines) to another directory /dir/B/b in a non-overlapping domain.

FIG. 13 shows the example state of the rename processing immediately after the rename/move operation. Note that the directory inode of the rename root (labeled 1330 in FIG. 13) is marked/tagged with the target domain ID in the transaction. First, after A/a is moved to Domain B, only Domain A transitions to the tagging state; a domain tag job is started on /dir/B/b/a. Next, domain membership tests use painting to conclude that moved files (still shown as dashed lines) are actually in Domain B (until the tag job completes); tests on "dashed-line" files still in Domain A will conclude (via painting) that such files are in domain A. When the tag job completes, Domain A transitions back to the ready state.

FIG. 14 shows the example in a state after the tag/mark job has completed and Domain A has transitioned out of the tagging state. Painting is no longer used to determine domain membership.

Turning to aspects related to patrons and patron instance data, a patron needs to be able to read and write data related to the domain instance with which the patron is operating. As described above with reference to FIGS. 3 and 4, a separate sub-key is defined to store data for a domain instance; the domain manager supports reading and writing of instance data of up to a limit (e.g., 1 MB in one or more implantations). In general, patron implementations only use instance data to store data that will be used during kernel filesystem operations; other miscellaneous data is stored in another location as determined by the patron implementation.

A patron implementation hooks into the filesystem at various points to perform the patron's specified functionality. A typical workflow for a patron is to use a filesystem hook, and get the patron specific domain membership of the file object(s) being used (or return if there are no domain instances).

By way of an example, a WORM (write once, read many) patron intercepts any modifications to the filesystem, such as the write path, rename, unlink, setattr, etc., to prevent the modifications if required. The WORM patron queries the inode(s) being modified for their domain membership, as filtered by the WORM patron. If an instance exists, the policies from the domain manager are fetched for that instance. If the policy states the inode(s) about to be modified cannot be modified (that is has been committed and is still within the retention period), the WORM patron blocks the modification (an returns an error code or the like).

As described herein, the domain manager provides a function to retrieve an inode's domain membership information (e.g., domain membership set) that is filtered for a specific patron. If needed, a patron fetches the instance data from the domain manager. The patron performs whatever operation is needed, and then, as needed, writes any instance data using the domain manager.

More particularly, patron hooks need to know whether, and if so which, domain instances apply to an inode during a filesystem operation. As described with reference to FIGS. 7 and 8, the membership query function fetches the base domain identifiers from the inode's domain attribute, checks if painting is required, and if so, performs a painting operation. The query function of the domain manager fetches the associated domain instances from the SBT, and filters out the instances that do not apply to the requesting patron. The function sorts the instances by the relative directory depths (DomBE's depth field) to allow the caller to determine nested domain hierarchy. The function then returns the filtered and sorted list to the caller. Note that if no patron type is supplied to the function, the domain instances are not filtered and all are returned.

Patrons have properties that define how various patron instances interact with each other as well as other filesystem operations. Patron properties are fixed and cannot be changed (immutable). A patron registers itself with flags or the like that define their properties, including property flags for instant (or not), nesting (or not), exclusions (or not), allowing or denying path rename, and whether or not hard links are allowed).

The instant property defines whether the membership for instances of the patron needs to be instantly available or not when the membership is fetched for a file object inside the domain before the domain tag job tags it. If this flag is set and any instances of this patron are undergoing a tagging operation (either for domain creation or rename), then a paint operation needs to be performed. If none of the domains undergoing a tagging operation have instances with this flag set, then painting will not occur.

The nesting property defines whether an instance of a patron can be created within an existing domain instance with the same patron or above it where the existing instance will be within the new instance. When a domain instance is created for the patron, the domain manager checks the patron's nesting property and will disallow the creation of nested domains (described below) if the property is not set.

The exclusions property defines whether the patron allows exclusions to be created or not. Exclusions are special domain instances that apply to another instance in which the exclusion is created. The inodes are tagged with both the original base domain identifier as well as the base domain identifier for the exclusion instance. The domain manager automatically applies the exclusion before returning the membership set for an inode. As exclusions are a domain instance, they can share the same DomBE as other normal domain instances and benefit from all of the advantages that DomBEs provide. Exclusions are primarily applicable to non-nestable domains.

The deny path rename property defines whether the path leading up to the domain is allowed to be renamed or not. If a domain instance exists with the corresponding patron's deny path rename property set to true, then attempting to rename the path components leading up to the domain's owning directory is denied. This property is appropriate for WORM domain instances.

The no hard links property defines whether hard links to a file across the domain boundary are permitted or not.

Callbacks are implemented for patrons. This allows patrons to handle domain events such as when an inode's membership is updated, and when a domain's state changes. For example, when a new file object is created, a create inode callback is sent to registered patrons before the inode is created to a directory format manager, with a parameter that contains the parent directory for the new inode. This callback can also be triggered when an ADS directory is created, and in this scenario, the "parent" can be a file or directory. Note that before the create inode callback, a transaction has been started, an inode has been created, but may not be fully configured, and the parent has been added to the transaction. When the inode creation transaction is about to be completed, a transaction commit callback is issued.

When an inode is to be unlinked, a transaction is created and the inode to be unlinked and the parent inode are added to the transaction. Then the domain manager is notified. The domain manager in turn notifies the patrons to check whether the inode can be unlinked through an unlink allowed callback, passing in the parent directory for the inode. If the patrons agree, the registered patrons then get an "on unlink" callback, supplying the inode being unlinked as well as the parent directory. It is possible for the "on unlink"

callback to be called with different DomIDs, as a new domain may exist on the inode being unlinked.

Metadata callbacks described above finish with a transaction commit callback, which is issued just before the transaction is to be committed. If the operation has failed or is to be aborted, this callback will still be issued but with a success parameter will be set to false. Patrons can use this to clean-up any temporary structures and state that were created during the initial metadata operation callback. The metadata callback's ID will be the same as the transaction pointer in this callback.

An "on tag" callback is issued when inodes are tagged with the base domain identifier during the domain tag job. This can be triggered by a domain creation or rename operation. No corresponding transaction commit callback is issued, but this is called during the tagging transaction.

When a tagging operation has been completed for a domain and no external hard links were found, a "ready" callback is issued to registered patrons. This is called in the context of a transaction that is updating the DomBE in the SBT for the corresponding domain.

As described herein, a domain tag job is implemented in the job engine to update the membership by tagging inodes in the domains, e.g., using a tree-walk library. Inodes need to be tagged when a domain instance is created in an existing directory that has never had a domain before, and when a directory is renamed in or out of an existing domain. The domain tag job reads the actions to perform from the persistent queue. A job coordinator sets an in-progress indicator on the state field in the persistent queue entry (e.g. on a Job ID). If the job coordinator finds that the in-progress indicator is already set to a different Job ID and that Job ID is cancelled or failed, the coordinator updates the indicator. If the in-progress is already set to an active job, the coordinator cancels current job. Once a job is complete, the domain's state is updated to ready and the persistent queue entry is removed. Note that the domain tag job should tag ADS files, e.g. for snapshots, otherwise an ADS file would need to paint to get domain tag membership from the parent file. As described above, when a domain instance is created on a root directory, it is assumed be created instantaneously and saved on every file in the system without a need to tag every file. When the tree walk finishes, the job sets the DomBE's ready property to true. To clear the tagging bit, the job looks up the base domain identifier key in the persistent queue, and if they are no more requests, clears the tagging bit while holding the domain persistent queue lock.

A domain daemon reads the domain persistent queue (e.g., at fixed intervals) and starts the domain tag job if there are any entries in it. The daemon's logic can be straightforward, e.g., the daemon can be only responsible for polling the persistent queue and starting the domain tag job.

Caching of domain information can be used so that domains do not adversely impact the operation of filesystem operations. A generic domain cache can be implemented, as well as an instance membership cache attached to inodes in the system. For example, a domain cache can be implemented as an in-memory read-through cache over the IFS Domains SBT. Domain cache invalidation can be achieved through global per-domain locks or using existing metadata server block locks from the SBT. The cache can be tagged against the base entry (which is noted on the inode attribute) and can pre-fetch associated domain instances and instance data. The cache may also record exclusion instance child-parent relation-ships. A Domain operation such as creation or deletion acquires the domain locks and invalidates the cache. If the cache is found missing in the I/O path, the first miss gets the shared lock and reads the entries from SBT. Instance data modification invalidates only the private blob for that patron's instance. This may be achieved by locking the base domain in shared mode and the patron's instance in exclusive mode (not possible with metadata server locks), in a way that avoids locking every instance in the I/O path A membership cache can be used, in that domain membership for an inode is normally fetched in the context of a filesystem operation, and each patron needs to obtain relevant membership information for the inodes involved in the operation. Several patrons can be involved in a single operation, each with one or more calls into the patron to perform various tasks. Obtaining membership is a common operation for IFS Domains, and sometimes after fetching the membership information, a patron will not do anything. By storing membership information in the inode, fetched on demand, domains can minimize the impact for every patron that requires membership information during a filesystem operation. The membership information can be an array of domain identifier instances. Patrons that do finding instances corresponding to work can then perform operations via the domain cache.

Note that denying path rename is available for a patron. In this way, the path leading to the domain instances cannot be renamed. To protect the paths to the domain instances, each directory has an inode attribute to track the instances. Instead of tracking each instance in the attribute, a reference count can be used in association with the patron that minimizes the size of the attribute in the inode. If the attribute exists and has a non-zero reference count, then the directory entry cannot be renamed.

Some patrons require that their instances cannot be nested within each other. During domain creation, if the patron disallows nesting, the operations check there are no domain instances above or below the directory with the same patron. Domain nesting can occur when a domain is created in a child directory of an existing domain, and when a domain is created in a parent directory of an existing domain. In a first scenario, the check is performed by checking the child directory's domain membership (painting if required). If the patron of the domain instance to be created is non-nestable and the directory is already a member of the same patron, then the domain creation will be denied. In a second scenario, an ancestor inode attribute (a dynamic inode attribute set on the path leading to the root of a domain) is utilized to check if there are any descendants that own a domain instance of the non-nestable patron. This means that not only patrons with the deny path rename property set will tag the path leading to the domain, but also any non-nestable patrons. This latter scenario is the reason for having a reference count for each patron type rather than an array of all domain instances in the ancestor attribute.

Turning to the concept of exclusions, some patrons (e.g., snapshots, partitioned performance (used to regulated the I/O rates on various areas of the filesystem) and deduplication) can benefit from having one or more subdirectories within a domain instance excluded from that domain's membership. For nestable patrons, this can be achieved by creating a child domain instance that overrides the parent's instance. For non-nestable patrons to implement exclusions, an exclusion domain instance can be created that excludes that domain from the parent domain instance. Exclusion instances can be created and deleted like a regular domain instances, which allows other regular instances to use the same DomBE as the exclusion instance.

In one implementation, the domain manager automatically applies exclusions when a client requests the membership for a file object. For example, if a file has a domain membership set of [2, 6, 14, 17] and instance 17 is an exclusion to instance 6, the domain manager will automatically apply the exclusions and return the membership set [2, 14] to the caller.

To track the relationship between domain instances and the exclusions, a data structure can be used for each domain instance and exclusion instance in the SBT. Part of the structure tracks the size of the domain identifiers array in the SBT entry, while a count value specifies the number of valid domain identifiers that are set in the array.

Figure 15:
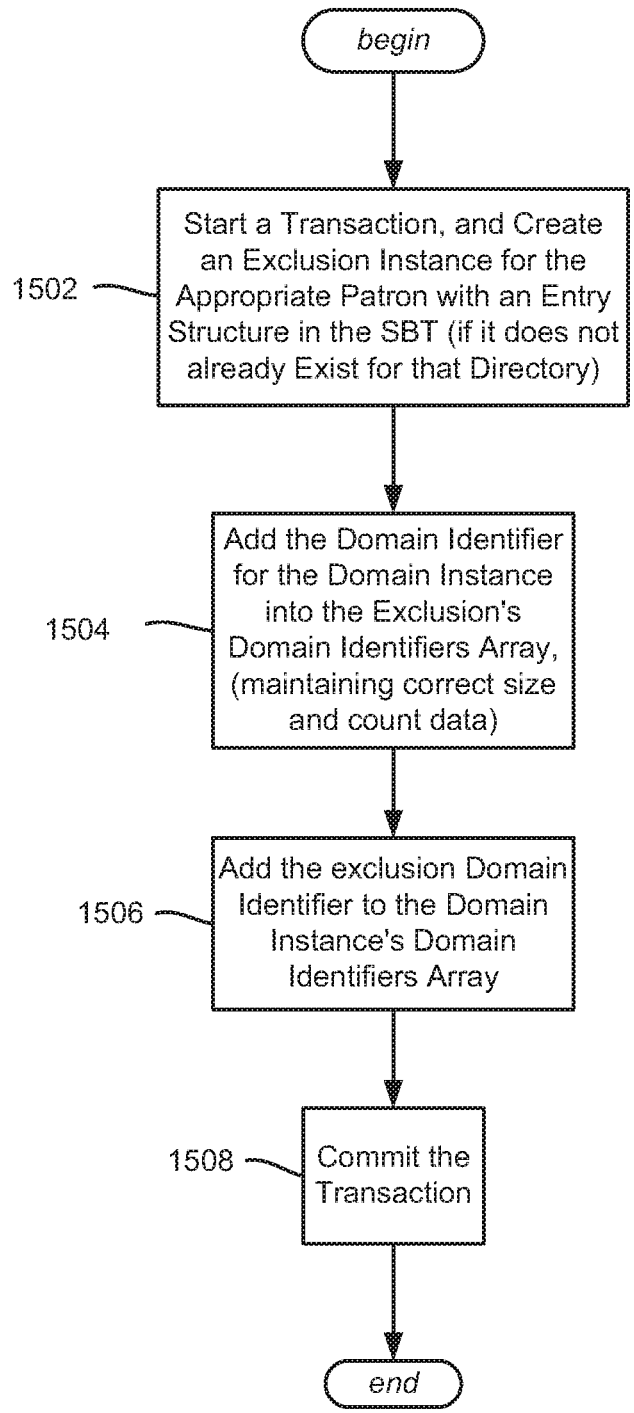
FIG. 15 is a flow diagram showing example operations related to excluding a domain, in accordance with various aspects and implementations of the subject disclosure.

As represented in FIG. 15, when an exclusion is added to a domain instance, at operation 1502 (in a transaction) the domain manager creates an exclusion instance with the appropriate patron with a corresponding domain entry structure in the SBT (if it does not yet exist for that directory). Operation 1504 adds the domain identifier for the domain instance into the exclusion's domain identifiers array, maintaining the size and count appropriately. Operation 1504 adds the exclusion domain identifier to the domain instance's domain identifiers array, and operation 1506 commits the transaction. Patron implementations are able to read and write data to the exclusion instance to manage how the exclusions will be applied to the domain instance to which the exclusion applies.

To removing an exclusion, the exclusion domain identifier is removed from the domain instance entry and the exclusion instance entry has the applicable domain identifier removed as well. If the exclusion instance's domain identifier count goes to zero, the exclusion instance can be removed from the SBT.

When a domain instance with exclusions is deleted, each of the exclusion instances has the deleted domain identifier removed as well. As with removing an exclusion, any exclusion instances that end up with a domain identifier count of zero, the exclusion instance is removed from the SBT as well.

Turning to other aspects of hard links, domains provides for allowing or disallowing hard links across domain boundaries for patrons. In one or more implementations, a file is a member of all domains through which it is hard linked. The state of readiness in regards to a domain is that it is fully tagged and has no external hard links. If a DomBE is still undergoing tagging due to its creation, the ready state cannot be determined, because there may be undiscovered hard links in the domain. In this case, any "hard links disallowed" instances will have to wait for the completion of the domain tag job, before it can transition to the ready state. This applies irrespectively of the value of the patron's instant property.

If a patron requires that a domain be ready but it remains unset after tagging has completed, then the hard links that were found need to be resolved by an administrator or user before the domain can enter the ready state. Options to resolve external hard links include copying the file, removing the hard link(s) into the domain; any domain internal hard links need to be maintained. Other options include removing the link(s) from within the domain without copying the file, or remove the link(s) outside the domain without copying. Another option is to add a method to exclude the file from the domain (although in one or more implementations, individual files cannot be excluded from a domain at the file level).

More particularly, domain patrons are able to create a domain as required by a work flow, and for example can be exported via a library. A single directory as the root of the domain can be provided, although a patron may be able to create a domain with multiple roots. A domain creation should automatically trigger an tag/mark job, unless the domain was created on an empty directory.

File filter based pattern matching or "single file only" domains are not available in one or more implementations. That is, domains are rooted in one (or many) directories. The API is only available to local filesystem applications, not directly to external clients. The patrons will be statically denied in the filesystem sources and cannot be dynamically added.

A rename can split an internal hard link and make it an external hard link. Thus, an incoming or outgoing rename cannot be allowed to succeed on a domain with any hard links disallowed instances. If the DomBE is undergoing tagging due to a rename, the ready status cannot be trusted, because an external hard link may have been added in the subdirectory that was renamed into the domain. Therefore, the ready state is invalid while the domain is in the tagging state.

While supporting hard links does not directly affect the ability to nest domains, it is possible that a sub-domain may be created in such a way that it splits the internal hard link parents into external hard links from the perspective of a child domain, thus creating external hard links for the child.

On a new directory, the hard links disallowed property indicates that external hard links are disallowed. During a domain tag job, files with multiple hard links are investigated to find external hard links. If external hard links are found, they are logged. At the completion of the domain tag job, the status of the patron is set to "pending user action." Because the domain tag job is finished at this point, other patron instances still may be added to the base domain. Once the user confirms that external hard links have been resolved, a rescan to confirm the hard link status is performed. Following a successful rescan, the domain is set to ready.

With respect to adding a no hard link patron to a pre-existing domain, to support a patron that does not allow hard links, a rescan of a pre-existing domain is performed before the patron's instance can be marked as ready. The rescan may be done by a domain tag job in a read only mode, which is likely faster than an actual tagging job.

Figure 16:
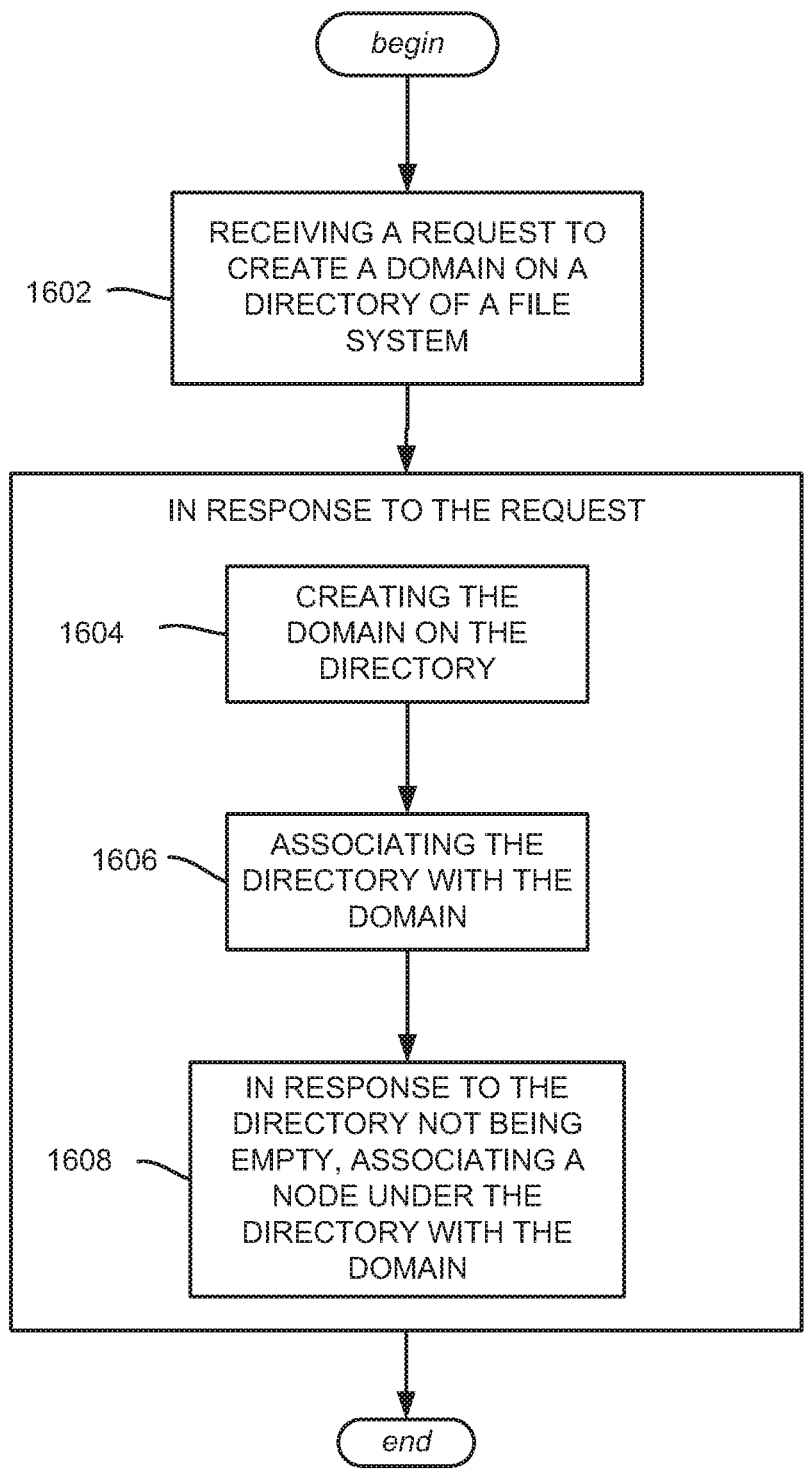
FIG. 16 is a flow diagram representing example operations related to creating a domain in response to a request (e.g., from a requesting data service), in accordance with various aspects and implementations of the subject disclosure.

One or more aspects, such as implemented in example operations of a method as in FIG. 16, are directed towards receiving (operation 1602), by a system comprising a processor, a request to create a domain on a directory of a filesystem. In response to the request, operation 1064 represents creating the domain on the directory, operation 1606 represents associating the directory with the domain, and operation 1608 represents in response to the directory not being empty, associating a node under the directory with the domain.

Aspects can comprise, in response to the request, storing an identifier of the domain in a domain data structure.

Aspects can comprise, in response to the request, updating a generation value in a domain data structure.

The request to create the domain can be a first request, the node can comprise a file object, and aspects can comprise receiving a second request to obtain domain membership information with respect to the file object. In response to the second request, aspects can comprise determining whether the domain membership information of the file object is up to date, and in response to the domain membership information of the file object being determined to be up to date, returning the domain membership information, and in response to the domain membership information of the file object being determined to be out of date, updating the domain membership information by obtaining updated domain membership information from a parent node of the file object. Aspects can comprise returning the updated domain membership.

When the directory is not empty, associating the node under the directory with the domain can comprise tagging an attribute associated with the node with an identifier of the domain to designate that the node is a member of the domain.

when the directory is not empty and the node comprises a file object, associating the node under the directory with the domain can comprise walking a directory hierarchy, and tagging a file attribute associated with the file object with an identifier of the domain to designate that the node is a member of the domain when the file object is reached during the walking.

When the directory is an empty directory, aspects can comprise detecting a new node added to the directory, and in response to the detecting, associating the new node with the domain.

Figure 17:
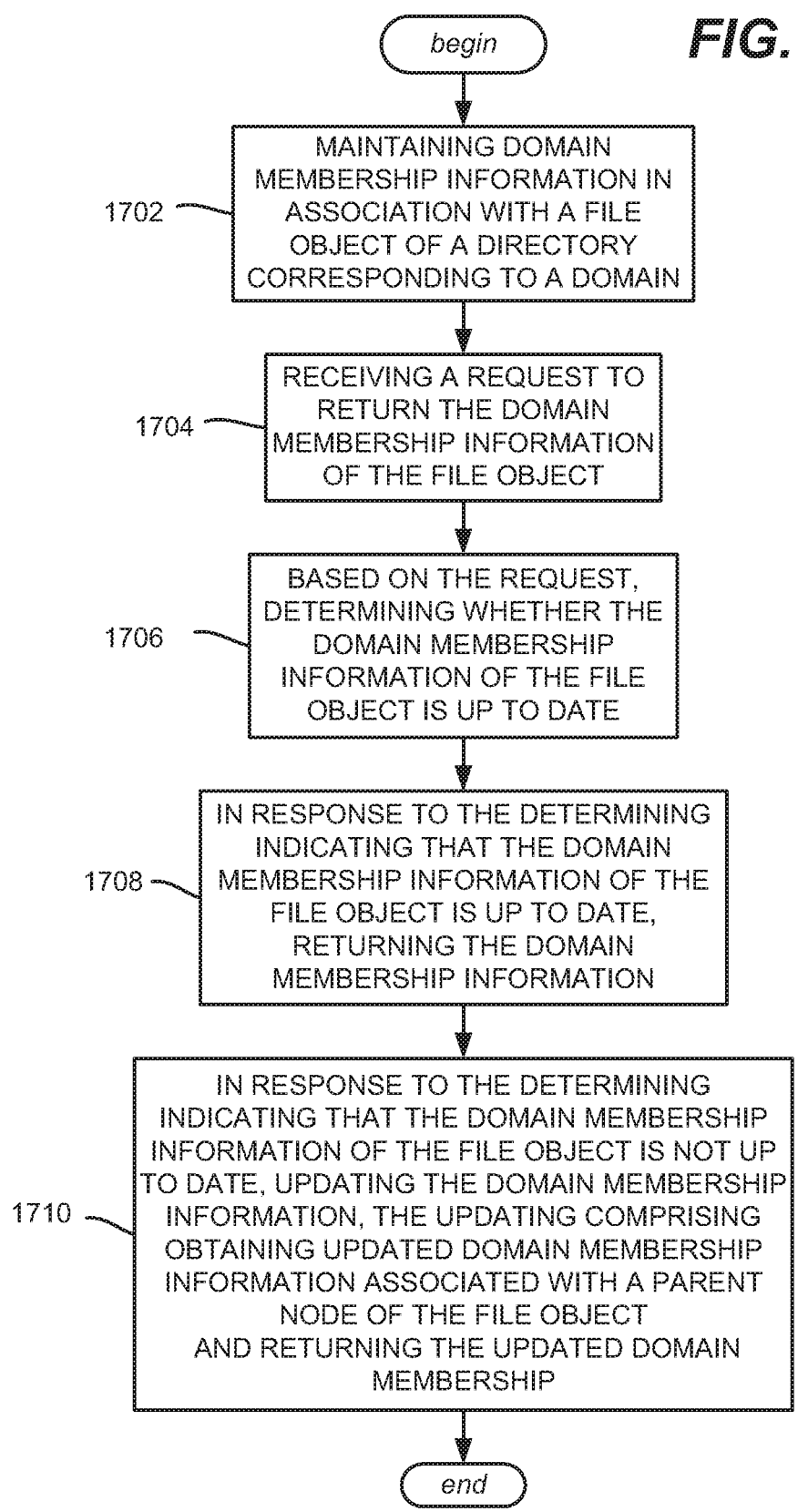
FIG. 17 is a flow diagram representing example operations related to maintaining domain membership information and returning such membership information when requested by a data service, in accordance with various aspects and implementations of the subject disclosure.

One or more example aspects are represented in FIG. 17, and can correspond to a system comprising a processor and a memory that stores executable instructions that, when executed by the processor, facilitate performance of operations. Example operations comprise operation 1702, which represents maintaining domain membership information in association with a file object of a directory corresponding to a domain. Operation 1704 represents receiving a request to return the domain membership information of the file object. Operation 1706 represents, based on the request, determining whether the domain membership information of the file object is up to date. Operation 1708 represents, in response to the determining indicating that the domain membership information of the file object is up to date, returning the domain membership information. Operation 1710 represents, in response to the determining indicating that the domain membership information of the file object is not up to date, updating the domain membership information, the updating comprising obtaining updated domain membership information associated with a parent node of the file object. Operation 1712 represents returning the updated domain membership.

Maintaining the domain membership information in association with the file object can comprise maintaining a domain identifier of the domain in metadata of the file object.

Aspects can comprise detecting an operation that renames the directory above the file object to a namespace corresponding to a second domain, obtaining first domain membership data of the first domain and second domain membership data of the second domain, and, in response to the first domain membership data being determined to be different from the second membership data, updating the domain membership information of the file object based on the second membership data.

The directory can be a first directory, the domain can be first domain, and aspects can comprise detecting an operation that provides a hard link the first directory to a second directory corresponding to a second domain, and updating the membership information associated with the file object based on domain data associated with the second domain.

Aspects can comprise detecting an operation that removes the hard link between the first directory and the second directory, and updating the membership information associated with the file object based on the file object being determined to be no longer hard linked via the first directory to the second directory.

The domain membership information of the file object can comprise a first domain identifier and a second domain identifier, and aspects can comprise adding a third domain identifier to the domain membership information, in which the third identifier logically excludes the first domain identifier from the domain membership information. Returning the domain membership information can comprise generating a response by excluding the first identifier from the response based on the third identifier, and returning the response comprising the second identifier.

The domain membership information of the file object can comprise a first domain identifier, and further example operations can comprise maintaining the first domain identifier in a domain data structure in conjunction with data service-specific data.

Determining whether the domain membership information of the file object is up to date can comprise evaluating a domain membership information generation number associated with the domain membership information of the file object against a generation counter value corresponding to a most-recent domain creation.

Figure 18:
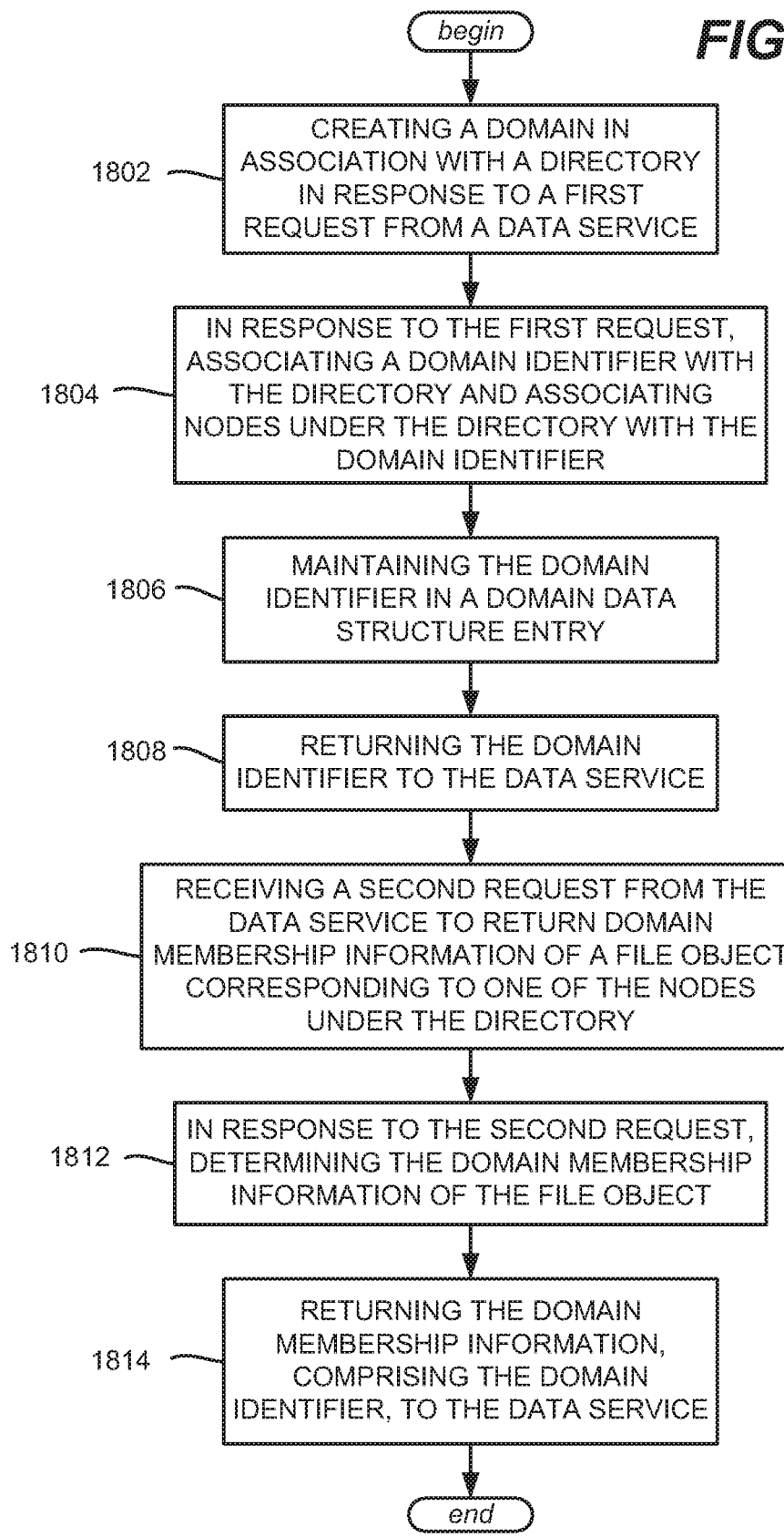
FIG. 18 is a flow diagram representing example operations related to creating a domain and returning membership information to a requesting data service, in accordance with various aspects and implementations of the subject disclosure.

One or more aspects, such as implemented in a machine-readable storage medium, comprising executable instructions that, when executed by a processor, facilitate performance of operations, are represented in FIG. 18. Example operations comprise operation 1802, which represents creating a domain in association with a directory in response to a first request from a data service. Operation 1804 represents, in response to the first request, associating a domain identifier with the directory, and associating nodes under the directory with the domain identifier. Operation 1806 represents maintaining the domain identifier in a domain data structure entry. Operation 1808 represents returning the domain identifier to the data service. Operation 1810 represents receiving a second request from the data service to return domain membership information of a file object corresponding to one of the nodes under the directory. Operation 1812 represents, in response to the second request, determining the domain membership information of the file object. Operation 1814 represents returning the domain membership information, comprising the domain identifier, to the data service.

Associating nodes under the directory with the domain identifier can comprise tagging the nodes with the domain identifier; further example operations can comprise, determining that the domain membership information is up to date by determining that no tagging operation is outstanding with respect to the directory and that no renaming operation is outstanding with respect to the directory.

The directory can comprise a first directory, the first directory can have a hard link to a second directory, and the determining the domain membership information of the file object can comprise combining domain membership information based on the first directory and the second directory.

As can be seen, described herein is a technology incorporating the concept of domains, which can be used by various data services to map a collection of files to a group. The membership can be determined in near constant time. Only one domain needs to be internally created for a single directory entry for all patrons requiring membership information starting at that directory.

Figure 19:
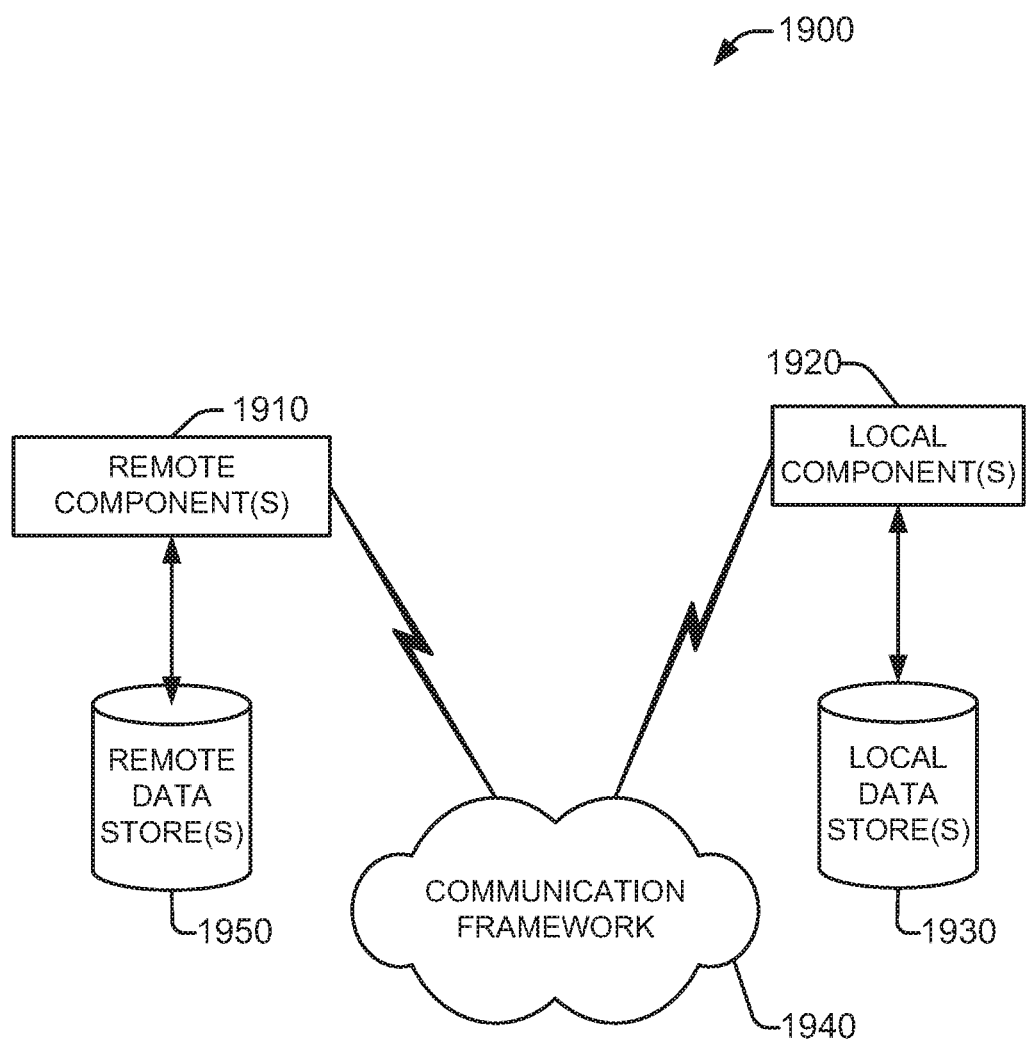
FIG. 19 depicts an example schematic block diagram of a computing environment with which the disclosed subject matter can interact, in accordance with various aspects and implementations of the subject disclosure.

FIG. 19 is a schematic block diagram of a computing environment 1900 with which the disclosed subject matter can interact. The system 1900 comprises one or more remote component(s) 1910. The remote component(s) 1910 can be hardware and/or software (e.g., threads, processes, computing devices). In some embodiments, remote component(s)

1910 can be a distributed computer system, connected to a local automatic scaling component and/or programs that use the resources of a distributed computer system, via communication framework 1940. Communication framework 1940 can comprise wired network devices, wireless network devices, mobile devices, wearable devices, radio access network devices, gateway devices, femtocell devices, servers, etc.

The system 1900 also comprises one or more local component(s) 1920. The local component(s) 1920 can be hardware and/or software (e.g., threads, processes, computing devices). In some embodiments, local component(s) 1920 can comprise an automatic scaling component and/or programs that communicate/use the remote resources 1910 and 1920, etc., connected to a remotely located distributed computing system via communication framework 1940.

One possible communication between a remote component(s) 1910 and a local component(s) 1920 can be in the form of a data packet adapted to be transmitted between two or more computer processes. Another possible communication between a remote component(s) 1910 and a local component(s) 1920 can be in the form of circuit-switched data adapted to be transmitted between two or more computer processes in radio time slots. The system 1900 comprises a communication framework 1940 that can be employed to facilitate communications between the remote component(s) 1910 and the local component(s) 1920, and can comprise an air interface, e.g., Uu interface of a UMTS network, via a long-term evolution (LTE) network, etc. Remote component(s) 1910 can be operably connected to one or more remote data store(s) 1950, such as a hard drive, solid state drive, SIM card, device memory, etc., that can be employed to store information on the remote component(s) 1910 side of communication framework 1940. Similarly, local component(s) 1920 can be operably connected to one or more local data store(s) 1930, that can be employed to store information on the local component(s) 1920 side of communication framework 1940.

Figure 20:
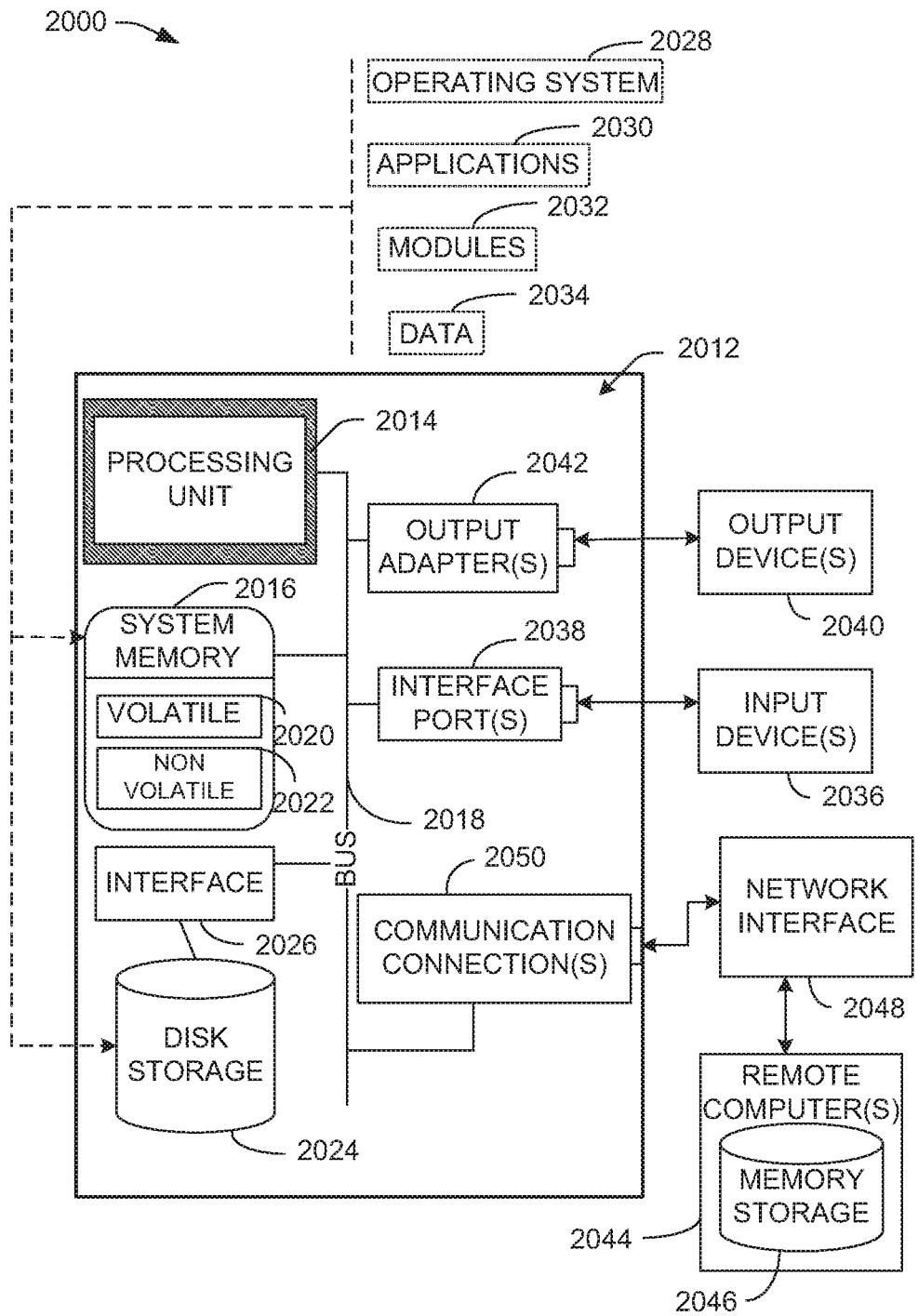
FIG. 20 illustrates an example block diagram of a computing system operable to execute the disclosed systems and methods in accordance with various aspects and implementations of the subject disclosure.

In order to provide a context for the various aspects of the disclosed subject matter, FIG. 20, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 2020 (see below), nonvolatile memory 2022 (see below), disk storage 2024 (see below), and memory storage 2046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 20 illustrates a block diagram of a computing system 2000 operable to execute the disclosed systems and methods in accordance with one or more embodiments/implementations described herein. Computer 2012, can comprise a processing unit 2014, a system memory 2016, and a system bus 2018. System bus 2018 couples system components comprising, but not limited to, system memory 2016 to processing unit 2014. Processing unit 2014 can be any of various available processors. Dual microprocessors and other multiprocessor architectures also can be employed as processing unit 2014.

System bus 2018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1594), and small computer systems interface.

System memory 2016 can comprise volatile memory 2020 and nonvolatile memory 2022. A basic input/output system, containing routines to transfer information between elements within computer 2012, such as during start-up, can be stored in nonvolatile memory 2022. By way of illustration, and not limitation, nonvolatile memory 2022 can comprise read only memory, programmable read only memory, electrically programmable read only memory, electrically erasable read only memory, or flash memory. Volatile memory 2020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 2012 can also comprise removable/non-removable, volatile/non-volatile computer storage media. FIG. 20 illustrates, for example, disk storage 2024. Disk storage 2024 comprises, but is not limited to, devices like a magnetic disk drive, floppy disk drive, tape drive, flash memory card, or memory stick. In addition, disk storage 2024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 2024 to system bus 2018, a removable or non-removable interface is typically used, such as interface 2026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 20 describes software that acts as an intermediary between users and computer resources described in suitable operating environment 2000. Such software comprises an operating system 2028. Operating system 2028, which can be stored on disk storage 2024, acts to control and allocate resources of computer system 2012. System applications 2030 take advantage of the management of resources by operating system 2028 through program modules 2032 and program data 2034 stored either in system memory 2016 or on disk storage 2024. It is to be noted that the disclosed subject matter can be implemented with various operating systems or combinations of operating systems.

A user can enter commands or information into computer 2012 through input device(s) 2036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 2012. Input devices 2036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 2014 through system bus 2018 by way of interface port(s) 2038. Interface port(s) 2038 comprise, for example, a serial port, a parallel port, a game port, a universal serial bus, an infrared port, a Bluetooth port, an IP port, or a logical port associated with a wireless service, etc. Output device(s) 2040 use some of the same type of ports as input device(s) 2036.

Thus, for example, a universal serial busport can be used to provide input to computer 2012 and to output information from computer 2012 to an output device 2040. Output adapter 2042 is provided to illustrate that there are some output devices 2040 like monitors, speakers, and printers, among other output devices 2040, which use special adapters. Output adapters 2042 comprise, by way of illustration and not limitation, video and sound cards that provide means of connection between output device 2040 and system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. Remote computer(s) 2044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 2012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 2046 is illustrated with remote computer(s) 2044. Remote computer(s) 2044 is logically connected to computer 2012 through a network interface 2048 and then physically connected by way of communication connection 2050. Network interface 2048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 2050 refer(s) to hardware/software employed to connect network interface 2048 to bus 2018. While communication connection 2050 is shown for illustrative clarity inside computer 2012, it can also be external to computer 2012. The hardware/software for connection to network interface 2048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:

receiving, by a system comprising a processor, a first request to create a domain on a directory of a filesystem;

in response to the first request,
creating the domain on the directory,
associating the directory with the domain, and
in response to the directory not being empty, associating any nodes under the directory with the domain;

receiving a second request to read from a binary large object of data stored in the domain on the directory;

in response to the second request, performing an iterative read of the binary large object of data, wherein a lock is held for a duration of the iterative read to prevent the binary large object of data from changing during the iterative read;

receiving a third request with respect to a file object stored in one of the nodes under the directory; and in response to the third request,
determining whether domain membership information associated with the file object is up to date,
in response to the domain membership information of the file object being determined to be up to date, returning the domain membership information, and
in response to the domain membership information of the file object being determined to be out of date, updating the domain membership information by obtaining updated domain membership information from a parent node of the file object, and returning the updated domain membership, wherein the domain membership information is cached in a domain cache, and wherein invalidation of the domain cache is performed using a global lock of each domain being invalidated.

2. The method of claim 1, further comprising, in further response to the first request, storing an identifier of the domain in a domain data structure.

3. The method of claim 1, further comprising, in further response to the first request, updating a generation value in a domain data structure.

4. The method of claim 1, wherein the directory is not empty, and wherein the associating the any of the nodes under the directory with the domain comprises tagging respective any attributes associated with the any of the nodes with an identifier of the domain to designate that the any of the nodes are members of the domain.

5. The method of claim 1, wherein the directory is not empty, wherein the node comprises the file object, and wherein the associating the any of the nodes under the directory with the domain comprises traversing a directory hierarchy associated with the directory, and tagging a file attribute associated with the file object with an identifier of the domain to designate that the any of the nodes are members of the domain when the file object is reached during the traversing.

6. The method of claim 1, wherein the directory is an empty directory, and further comprising, detecting a new node added to the directory, and in response to the detecting, associating the new node with the domain.

7. A system, comprising:

a processor; and a memory that stores executable instructions that, when executed by the processor, facilitate performance of operations, the operations comprising:

in response to a first request to create a domain on a directory of a filesystem,
creating the domain on the directory,
associating the directory with the domain, and
in response to the directory not being empty, associating any nodes under the directory with the domain;

receiving a second request to read from a binary large object of data stored in the domain on the directory;

in response to the second request, performing an iterative read of the binary large object of data, wherein a lock is held for a duration of the iterative read to prevent the binary large object of data from changing during the iterative read;

receiving a third request with respect to a file object stored in one of the nodes under the directory; and in response to the third request, determining whether domain membership information associated with the file object is up to date, in response to the domain membership information of the file object being determined to be up to date, returning the domain membership information, and in response to the domain membership information of the file object being determined to be out of date, updating the domain membership information, the updating comprising obtaining updated domain membership information associated with a parent node of the file object, and returning the updated domain membership, wherein the domain membership information is cached in a domain cache, and wherein invalidation of the domain cache is performed using a global lock of each domain being invalidated.

8. The system of claim 7, wherein the associating the directory with the domain comprises associating the directory with the domain membership information, and associating the file object with the domain membership information.

9. The system of claim 7, wherein the operations further comprise, maintaining the domain membership information in association with the file object comprising maintaining a domain identifier of the domain in metadata of the file object.

10. The system of claim 7, wherein the operations further comprise, detecting an operation that renames the directory above the file object to a namespace corresponding to a second domain, obtaining first domain membership data of the first domain and second domain membership data of the second domain, and, in response to the first domain membership data being determined to be different from the second membership data, updating the domain membership information of the file object based on the second membership data.

11. The system of claim 7, wherein the directory is a first directory, wherein the domain is a first domain, and wherein the operations further comprise, detecting an operation that provides a hard link from the first directory to a second directory corresponding to a second domain, and updating the domain membership information associated with the file object based on domain data associated with the second domain.

12. The system of claim 11, wherein the operations further comprise, detecting an operation that removes the hard link between the first directory and the second directory, and updating the domain membership information associated with the file object based on the file object being determined to be no longer hard linked via the first directory to the second directory.

13. The system of claim 7, wherein the domain membership information of the file object comprises a first domain identifier and a second domain identifier, and wherein the operations further comprise, adding a third domain identifier to the domain membership information, in which the third domain identifier logically excludes the first domain identifier from the domain membership information.

14. The system of claim 13, wherein the returning the domain membership information comprises generating a response by excluding the first identifier from the response based on the third identifier, and returning the response comprising the second identifier.

15. The system of claim 7, wherein the domain membership information of the file object comprises a first domain identifier, and wherein the operations further comprise, maintaining the first domain identifier in a domain data structure in conjunction with data service-specific data.

16. The system of claim 7, wherein the determining whether the domain membership information of the file object is up to date comprises evaluating a domain membership information generation number associated with the domain membership information of the file object against a generation counter value corresponding to a most-recent domain creation.

17. A non-transitory machine-readable medium, comprising executable instructions that, when executed by a processor, facilitate performance of operations, the operations comprising:
in response to a first request from a data service,
creating a domain in association with a directory of a filesystem,
associating the directory with a domain identifier,
in response to the directory not being empty, associating any nodes under the directory with the domain identifier,
receiving a second request to read from a binary large object of data stored in the domain on the directory;
in response to the second request, performing an iterative read of the binary large object of data, wherein a lock is held until the iterative read is complete to prevent changes being made to the binary large object of data during the iterative read;
receiving a third request with respect to a file object stored in one of the nodes under the directory; and
in response to the third request,
determining whether domain membership information associated with the file object is up to date,
in response to the domain membership information of the file object being determined to be up to date, returning the domain membership information, and
in response to the domain membership information of the file object being determined to be out of date, updating the domain membership information by obtaining updated domain membership information from a parent node of the file object, and returning the updated domain membership, wherein the domain membership information is cached in a domain cache, and wherein invalidation of the domain cache is performed using a global lock of each domain being invalidated.

18. The non-transitory machine-readable medium of claim 17, wherein the associating the any of the nodes under the directory with the domain identifier comprises tagging the any of the nodes with the domain identifier, and wherein the operations further comprise, determining that the domain membership information is up to date by determining that no tagging operation is outstanding with respect to the directory and that no renaming operation is outstanding with respect to the directory.

19. The non-transitory machine-readable medium of claim 17, wherein the directory comprises a first directory, wherein the first directory has a hard link to a second directory, and wherein the determining the domain membership information of the file object comprises combining domain membership information based on the first directory and the second directory.

20. The non-transitory machine-readable medium of claim 17, wherein the operations further comprise, in further response to the first request, storing the domain identifier in a domain data structure, and updating a generation value in the domain data structure.

* * * * *